United States Patent
Minachi et al.

(10) Patent No.: US 7,919,007 B2
(45) Date of Patent: Apr. 5, 2011

(54) FERRITE MAGNETIC MATERIAL

(75) Inventors: Yoshihiko Minachi, Tokyo (JP); Noboru Ito, Tokyo (JP); Yuuki Aburakawa, Tokyo (JP); Yoshinori Fujikawa, Tokyo (JP); Satoko Ueda, Tokyo (JP)

(73) Assignee: TDK Corporation, Tokyo (JP)

( * ) Notice: Subject to any disclaimer, the term of this patent is extended or adjusted under 35 U.S.C. 154(b) by 111 days.

(21) Appl. No.: 11/611,180

(22) Filed: Dec. 15, 2006

(65) Prior Publication Data

US 2007/0138432 A1 Jun. 21, 2007

(30) Foreign Application Priority Data

Dec. 19, 2005 (JP) ................................ 2005-364225
Nov. 8, 2006 (JP) ................................ 2006-302328

(51) Int. Cl.
*C04B 35/40* (2006.01)
*C04B 35/26* (2006.01)
*H01F 1/00* (2006.01)

(52) U.S. Cl. ................ 252/62.63; 252/62.62; 252/62.57

(58) Field of Classification Search ............... 252/62.63, 252/62.57, 62.62
See application file for complete search history.

(56) References Cited

U.S. PATENT DOCUMENTS

| | | | | |
|---|---|---|---|---|
| 6,086,781 A * | 7/2000 | Taguchi et al. | ............ | 252/62.57 |
| 6,139,766 A * | 10/2000 | Taguchi et al. | ............ | 252/62.57 |
| 6,258,290 B1 * | 7/2001 | Taguchi et al. | ............ | 252/62.59 |
| 6,383,407 B2 * | 5/2002 | Ogata et al. | ................ | 252/62.63 |
| 6,402,980 B1 * | 6/2002 | Taguchi et al. | ............ | 252/62.63 |
| 6,419,847 B1 * | 7/2002 | Toyota et al. | ............ | 252/62.57 |
| 6,478,982 B1 * | 11/2002 | Anamoto et al. | .......... | 252/62.63 |

FOREIGN PATENT DOCUMENTS

| | | |
|---|---|---|
| EP | 0 905 718 A1 | 3/1999 |
| EP | 1 667 176 A1 | 6/2006 |
| FR | 2 831 317 A1 | 4/2003 |
| JP | 11-154604 | 6/1999 |
| JP | 2000-195715 | 7/2000 |
| JP | 2000-223307 | 8/2000 |
| JP | 2001-181057 A | 7/2001 |
| JP | 2005-294330 A | 10/2005 |
| JP | 2006-104050 | 4/2006 |
| JP | 2006-165364 A | 6/2006 |
| WO | 2005/027153 A1 | 3/2005 |

* cited by examiner

*Primary Examiner* — C. Melissa Koslow
*Assistant Examiner* — Matthew E Hoban
(74) *Attorney, Agent, or Firm* — Dariush G. Ali; Adli Law Group P.C.

(57) ABSTRACT

The present invention provides a ferrite magnetic material capable of attaining such magnetic properties that $Br+(1/3)HcJ$ is 6200 or more even by sintering at a temperature of 1150° C. or lower. The ferrite magnetic material includes as a main phase thereof a ferrite phase having a hexagonal structure, the main phase being represented by the following composition formula (1): $La_xCa_m\alpha_{1-x-m}(Fe_{12-y}Co_y)_z$ with $\alpha$ representing one or two of Ba and Sr; wherein the constituent ratios of the metal elements constituting the main phase satisfy the following conditions: x and m are the values in a region bounded by the points, A: (0.53, 0.27), B: (0.64, 0.27), C: (0.64, 0.35), D: (0.53, 0.45), E: (0.47, 0.45) and F: (0.47, 0.32) in the (x, m) coordinates shown in FIG. 2; $1.3 \leq x/yz \leq 1.8$; and $9.5 \leq 12z \leq 11.0$.

15 Claims, 8 Drawing Sheets

FERRITE MAGNETIC MATERIAL

BACKGROUND OF THE INVENTION

1. Field of the Invention

The present invention relates to a ferrite magnetic material to be suitably used for a sintered magnet, a magnet powder and the like, in particular, a ferrite magnetic material capable of attaining non-conventionally high magnetic properties even by sintering at a relatively low sintering temperature.

2. Description of the Related Art

For example, as ferrite magnetic materials to be used for sintered magnets, hexagonal Ba ferrites or hexagonal Sr ferrites are known, and at present, the magnetoplumbite-type (M-type) Ba ferrites or the M-type Sr ferrites are predominantly used. The M-type ferrite is represented by a general formula $AFe_{12}O_{19}$, in which Ba or Sr is applied to the atom constituting the A-site. An M-type ferrite in which Sr is adopted for the element constituting the A-site, a part thereof is substituted with a rare earth element, and further a part of Fe is substituted with Co is known to have high magnetic properties (residual magnetic flux density and coercive force) (Patent Documents 1 and 2). As has been established, it is essential that the M-type ferrite contains La as the rare earth element. This is because La is highest among the rare earth elements with respect to the solid solubility limit amount in the M-type hexagonal ferrite. Patent Documents 1 and 2 disclose that the use of La as the substitution element for the A-site constituting element permits the increase of the amount of Co solid solution to substitute a part of Fe and contributes to the improvement of the magnetic properties.

When the A sites in an M-type ferrite magnetic material are occupied exclusively by Ca, no hexagonal ferrite can be formed, and accordingly such an M-type ferrite magnetic material has not been used as a magnet material; however, as is known, even when Ca is an element constituting the A site, the addition of La permits the formation of a hexagonal ferrite, and the further addition of Co results in manifestation of high magnetic properties (Patent Document 3). Such a ferrite magnetic material can be described as an M-type ferrite in which Ca is selected as the element constituting the A site, a part thereof is substituted with at least one rare earth element (surely comprising La), and further a part of Fe is substituted with Co.

Additionally, Patent Document 4 discloses a ferrite sintered magnet comprising Ca as an element constituting the A site. Patent Document 4 aims at the retention of a high coercive force not to be degraded even when the ferrite sintered magnet is formed to be thin while maintaining a high residual magnetic flux density, the composition of such a ferrite sintered magnet being specified by the following general formula:

$$A_{1-x-y+a}Ca_{x+y}R_{y+c}Fe_{2n-z}Co_{z+d}O_{19} \text{ (in atomic ratios)}$$

In this formula, the element A includes Sr, or Sr and Ba; the element R is at least one of the rare earth elements inclusive of Y with the proviso that the element R surely includes La; x, y, z and n represent the contents of Ca, the element R and Co, and the molar ratio, in a calcined body, respectively; a, b, c and d represent the contents of the element A, Ca, the element R and Co, added in a pulverizing step of the calcined body, respectively; and these quantities respectively satisfy the following conditions:

$0.03 \leq x \leq 0.4, 0.1 \leq y \leq 0.6, 0 \leq z \leq 0.4, 4 \leq n \leq 10,$
$x+y<1, 0.03 \leq x+b \leq 0.4, 0.1 \leq y+c \leq 0.6, 0.1 \leq z+d \leq 0.4,$ $0.50 \leq [(1-x-y+a)/(1-y+a+b)] \leq 0.97,$ $1.1 \leq (y+c)/(z+d) \leq 1.8, 1.0 \leq (y+c)/x \leq 20,$ and $0.1 \leq x/(z+d) \leq 1.2.$ Further, Patent Document 5 discloses a ferrite sintered magnet containing Ca as an element constituting the A site. The ferrite sintered magnet of Patent Document 5 has a composition represented by a formula $(1-x)CaO \cdot (x/2)R_2O_3 \cdot (n-y/2)Fe_2O_3 \cdot yMO$, in which R includes at least one element selected from La, Nd and Pr with the proviso that R surely includes La, M includes at least one element selected from Co, Zn, Ni and Mn with the proviso that M surely includes Co, and x, y and n representing molar ratios respectively satisfy the relations $0.4 \leq x \leq 0.6, 0.2 \leq y \leq 0.35, 4 \leq n \leq 6,$ and $1.4 \leq x/y \leq 2.5$.

Patent Document 1: Japanese Patent Laid-Open No. 11-154604

Patent Document 2: Japanese Patent Laid-Open No. 2000-195715

Patent Document 3: Japanese Patent Laid-Open No. 2000-223307

Patent Document 4: International Publication No. 2005/027153

Patent Document 5: Japanese Patent Laid-Open No. 2006-104050

SUMMARY OF THE INVENTION

The ferrite magnetic materials disclosed in above-mentioned Patent Documents 1 to 5 can attain such magnetic properties that cannot be attained by conventional M-type ferrite magnetic materials.

The value of the residual magnetic flux density (Br: G)+⅓ the coercive force (HcJ:Oe) (hereinafter, simply represented as Br+(⅓)HcJ) is used as a comprehensive measure of the magnetic properties including the residual magnetic flux density and the coercive force. The ferrite sintered magnets disclosed in Patent Documents 1 to 4 can attain Br+(⅓) HcJ values of approximately 5750 to 6000. However, the ferrite sintered magnets disclosed in Patent Documents 1 to 3are required to be sintered at temperatures in the vicinity of 1200° C., for the purpose of obtaining such values. When the sintering temperature is high, the energy consumption is inevitably increased and the wall of the sintering furnace tends to be worn out. From the viewpoint of the energy saving inclusive of the wear of the furnace wall, it is desired to obtain intended magnetic properties at lower sintering temperatures.

Further, the current market demands magnetic properties higher than those of the ferrite magnetic materials disclosed in Patent Documents 1 to 3, and accordingly, there is demanded the advent of ferrite magnetic materials capable of attaining the Br+(⅓)HcJ values of 6200 or more.

Patent Document 5 discloses a ferrite sintered magnet (for example, Example 8) having a Br+(⅓)HcJ value of 6200 or more. However, this ferrite magnet was obtained by sintering at 1190° C., and at the lower sintering temperatures, specifically, at the sintering temperatures of 1150° C. or lower, no Br+(⅓)HcJ of 6200 or more has been obtained.

The present invention has been achieved on the basis of these technical problems, and takes as its object the provision of a ferrite magnetic material capable of attaining such magnetic properties that the Br+(⅓)HcJ is 6200 or more even when sintered at temperatures of 1150° C. or lower.

Patent Documents 1 and 2 disclose the M-type ferrite magnetic materials which can fall in the ranges of $0.04 \leq x \leq 0.9$ and $0.04 \leq y \leq 0.5$ in the composition formula $Sr_{1-x}R_x(Fe_{12-}$

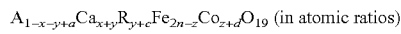

$_y$Co$_y$)$_z$O$_{19}$. However, for example, as shown in FIG. 1 in Patent Document 1, it is necessary that x=y=0.2 to 0.4 in the above described composition formula in order to obtain a high residual magnetic flux density (Br) and a high coercive force (HcJ). Even when the quantities x and y are increased, R and Co cannot be substituted into or solid-dissolved in the hexagonal ferrite phase, and for example, an orthoferrite which contains the element R is generated to degrade the magnetic properties. Consequently, the magnetic property improvement by increasing the R and Co amounts substituted or solid-dissolved into the hexagonal ferrite phase is limited.

The present inventors have found that when one or two of Ba and Sr are made to be present concomitantly with Ca at the A sites, the amount of R solid solution (substituted amount of R), in particular, La in the hexagonal ferrite phase can be made large, and additionally, by specifying the amounts of the individual ferrite constituting elements, even the sintering at temperatures of 1150° C. or lower, preferably at temperatures of 1145° C. or lower attains a Br+(⅓)HcJ value of 6200 or more. Such a hexagonal ferrite can be referred to as a hexagonal La ferrite because the ratio of La at the A site is generally larger than the ratio of one or two of Ba and Sr as the A site constituting elements and the ratio of Ca as the A site constituting element.

More specifically, the ferrite magnetic material of the present invention includes as a main phase thereof a ferrite phase having a hexagonal structure, the main phase being represented by the composition formula (1): La$_x$Ca$_m$α$_{1-x-m}$(Fe$_{12-y}$Co$_y$)$_z$ with α representing one or two of Ba and Sr; wherein the constituent ratios of the metal elements constituting the main phase satisfy the following conditions: x and m are the values in a region bounded by the points, A:(0.53, 0.27), B: (0.64, 0.27), C: (0.64, 0.35), D: (0.53, 0.45), E: (0.47, 0.45) and F(0.47, 0.32) in the (x, m) coordinates shown in FIG. 2; 1.3≦x/yz≦1.8; and 9.5≦12z≦11.0. It is to be noted that x, y, z and m are given in molar ratios. It is also to be noted that the values in the region bounded by the points A: (0.53, 0.27), B: (0.64, 0.27), C: (0.64, 0.35), D: (0.53, 0.45), E: (0.47, 0.45) and F: (0.47, 0.32) are meant to include the values on the line segments connecting the individual points. The ferrite sintered magnet of the present invention satisfying the above described composition formula can attain a Br+(⅓)HcJ value of 6200 or more even when the sintering temperature is 1150° C. or lower, preferably, 1145° C. or lower.

In the present invention, it is preferable that (1−x−m)/(1−x)≦0.42, and it is also preferable that 1.35≦x/yz≦1.75 and 9.7≦12z≦10.7.

According to the present invention, even when the sintering temperature is 1150° C. or lower, preferably 1145° C. or lower, the value of Br+(⅓)HcJ can be made to be 6200 or more, and furthermore 6300 or more.

DETAILED DESCRIPTION OF THE PREFERRED EMBODIMENTS

Figure 1:
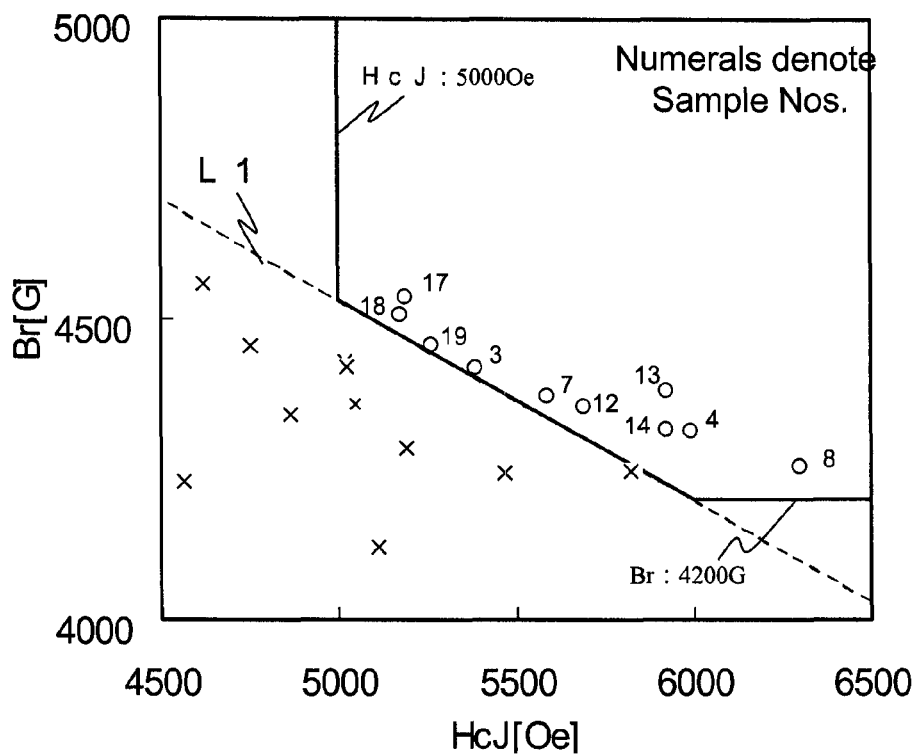
FIG. 1 is a graph showing the relation between the residual magnetic flux density (Br) and the coercive force (HcJ) in Example 1.

The ferrite magnetic material of the present invention will be described below in detail.

As described above, the present invention can be referred to as a La ferrite because the La ratio in the so-called A site is large. However, the ratios of the other elements constituting the A sites, namely, one or two of Ba and Sr, and Ca in the A sites are too small, the amount of La solid solution in the hexagonal ferrite cannot be ensured and consequently the advantageous effects of the present invention cannot be attained.

In the present invention, when La(x) is small, the improvement effects of the magnetic properties cannot be obtained to a sufficient extent. The ferrite magnetic material of the present invention is characterized in that the amount of La solid solution in the ferrite phase can be made large; however, when the amount of La is made too large, the presence of La that can not be solid-dissolved gives a factor to cause the generation of a nonmagnetic phase such as orthoferrite.

In the present invention, when the amount of Ca (m) is small, the amount of La solid solution cannot be made sufficiently large. However, when the amount of Ca becomes too large, the ratio of the sum of the amount of La and the amount of α at the A site becomes small. Within the concerned range of the Ca amount, when the amount of La is reduced, the advantageous effects of the large amount substitution of La fades away, and when α is set at 0, α-Fe$_2$O$_3$ tends to be easily generated.

In the present invention, Fe is a fundamental element constituting the ferrite. When the amount of Fe is too small, the A site becomes excessive, the elements constituting the A sites are discharged from the main phase to increase the nonmagnetic grain boundary constituents unnecessarily, and consequently the saturation magnetization becomes low. Alternatively, when the amount of Fe is too large, α-Fe$_2$O$_3$ is generated.

In the present invention, Co partially substitutes the Fe in the M-type ferrite phase to attain an improvement effect of the magnetic properties. When the amount of Co is small, the improvement effects of the magnetic properties due to the partial substitution of the Fe with Co cannot be attained to a sufficient extent. On the other hand, when the amount of Co is too large, the optimal point of the charge balance between Co and La is passed over, and consequently the magnetic properties are degraded.

On the premise of the above described actions and effects of the individual elements, the ferrite magnetic material of the present invention includes a ferrite phase having a hexagonal structure as the main phase, the main phase being represented by the following composition formula (1), $La_xCa_m\alpha_{1-x-m}(Fe_{12-y}Co_y)_z$; wherein the constituent ratios of the metal elements constituting the main phase satisfy the following conditions: x and m are the values in a region (hereinafter referred to as the first region) bounded by the points, A:(0.53, 0.27), B:(0.64, 0.27), C:(0.64, 0.35), D: (0.53, 0.45), E: (0.47, 0.45) and F: (0.47, 0.32) in the (x, m) coordinates shown in FIG. 2; $1.3 \leq x/yz \leq 1.8$; and $9.5 \leq 12z \leq 11$.

When x and m in the composition formula (1) fall outside the above-mentioned region, as shown in Examples to be described later, a sintering temperature of 1150° C. or lower cannot attain a Br+(⅓)HcJ value of 6200 or more. According to the present invention, a Br+(⅓)HcJ value of 6250 or more, and further a Br+(⅓)HcJ value of 6300 or more can be obtained.

The above described composition formula (1) is based on the general formula of the M-type ferrite, the general formula being well known to those skilled in the art and the composition formula (1) indicating the composition of the so-called main phase. In other words, the elements constituting the composition formula (1) are usually the elements constituting the main phase. Among the elements constituting the composition formula (1), however, Ca is an element that is also usable as an additive. When the amounts of the constituting elements of a ferrite magnetic material comprising a sintered body are analyzed, the analysis results of those elements which are found both in the main phase and in the additives cannot distinguish the amounts of those elements in the main phase from the amounts of those elements in the additives. Accordingly, in the present invention, the amount of Ca in the composition formula (1) means the sum of the amount in the main phase and the amount in the additive.

In the present invention, the ratio between La and Co (La/Co) is important for the purpose of obtaining high magnetic properties. According to Patent Documents 1 to 3, La/Co is ideally 1; in other words, because a part of $Sr^{2+}$ and a part of $Fe^{3+}$ in the M-type ferrite represented by $Sr^{2+}Fe^{3+}_{12}O_{19}$ are substituted with La and Co, respectively, it is claimed to be ideal that the ratio between La and Co is set at 1. However, the present inventors have found that in a predetermined range of La/Co exceeding 1 in the hexagonal La ferrite according to the present invention, the coercive force can be improved without degrading the residual magnetic flux density. In the present invention, by setting La/Co, namely, x/yz to fall within a range from 1.3 to 1.8, high magnetic properties can be obtained. The range of x/yz is preferably from 1.35 to 1.75 and more preferably from 1.4 to 1.7.

When z is too small in the above described composition formula (1), the proportion of the A site becomes surplus, and the A site migrates away from the main phase to increase in vain the nonmagnetic grain boundary constituent and the saturation magnetization is lowered. On the other hand, when z is too large, the nonmagnetic $\alpha$-$Fe_2O_3$ phase or the Co-containing soft magnetic spinel ferrite phase grows, and consequently the residual magnetic flux density (Br) becomes low. In this connection, the total amount of Fe and Co is represented by 12z on the basis of the above described composition formula (1). As will be shown in Examples to be described later, by specifying the 12z representing the total amount of Fe and Co, the present invention can attain such high magnetic properties that are represented by the line L1 or are higher than the line L1. More specifically, the present invention adopts the range of $9.5 \leq 12z \leq 11$. The range of 12z is preferably $9.7 \leq 12z \leq 10.7$ and more preferably $10 \leq 12z \leq 10.5$.

In the present invention, the ratio between $\alpha$ and Ca ($\alpha/(\alpha+Ca)$) is important for the purpose of obtaining high magnetic properties. In the present invention, by setting $\alpha/(\alpha+Ca)$, namely, $(1-x-m)/(1-x)$ at 0.42 or less, high magnetic properties can be obtained. The range of $(1-x-m)/(1-x)$ is preferably from 0.0005 to 0.42, more preferably from 0.018 to 0.40 and even more preferably from 0.038 to 0.35.

The gross constituent ratios of the metal elements, La, Ca, $\alpha$, Fe and Co, are represented by the above described composition formula (1), and when oxygen is also included, the gross constituent ratios of the elements involved are represented by $La_xCa_m\alpha_{1-x-m}(Fe_{12-y}Co_y)_zO_{19}$. The present invention can yield a ferrite magnetic material in which the ratio of the M-type hexagonal ferrite phase (M phase) represented by this composition formula amounts to 95% or more. In the above formula, the number of the oxygen atoms is set at 19, which indicates the stoichiometric composition ratio of oxygen O when Co is divalent, Fe and La are trivalent, and x=y and z=1. Depending on the x, y and z values, the number of the oxygen atoms varies. Additionally, for example, when the sintering atmosphere is a reductive atmosphere, there is a possibility that oxygen O defects (vacancies) are generated. Further, in the M-type ferrite phase, Fe usually has a valency of 3, but there is a possibility that the valency is converted into 2, etc. Additionally, Co has also the possibility of changing the valency thereof, and further, R has a possibility of taking the valency other than 3. Depending on such conditions, the ratio of oxygen O to the metal elements varies. In the above description, and also in Examples to be described later, the number of the oxygen atoms is given a value of 19 irrespective as to the values of x, y and z; however, the actual number of the oxygen atoms deviates somewhat from this value as the case may be, and needless to say, the present invention also includes such cases.

In the ferrite magnetic material of the present invention, on the basis of the premise that a predetermined amount of La constituting the A site is contained therein, a part of La can be substituted with one or more of other rare earth elements (Ce, Pr, Nd, Pm, Eu, Gd, Tb, Dy, Ho, Er, Tm, Yb and Lu). Additionally, in the ferrite magnetic material of the present invention, the element a includes one or two of Ba and Sr.

The composition of the ferrite magnetic material of the present invention can be measured by means of fluorescent X-ray quantitative analysis or the like. When the ferrite magnetic material constitutes a sintered body, the composition of the sintered body can be analyzed by means of fluorescent X-ray quantitative analysis. The contents of the individual elements specified in the present invention can be specified on the basis of such analysis results. The presence of the M phase in the ferrite magnetic material of the present invention can be identified by means of X-ray diffraction, electron beam diffraction or the like. Specifically, in the present invention, the proportion (mol %) of the M phase was determined by X-ray diffraction under the following conditions. The proportion of the M phase was derived with reference to the X-ray diffraction intensities obtained for the samples in which the powders of M-type ferrite, orthoferrite, hematite and spinel were mixed together in predetermined ratios (this is also the case for Examples to be described later).

X-ray generator: 3 kW
Tube voltage: 45 kV

Tube current: 40 mA
Sampling width: 0.02 deg
Scanning speed: 4.00 deg/min
Divergence slit: 1.00 deg
Scattering slit: 1.00 deg
Receiving slit: 0.30 mm The ferrite magnetic material according to the present invention may include as additives a Si constituent and a Ca constituent. The Si constituent and the Ca constituent as additives aim at the improvement of the sinterability, the control of the magnetic properties, the regulation of the grain size of the sintered body and the like. As described above, Ca is an element contained also as the main phase, and the description herein is exclusively associated with the Ca constituent as an additive. It is to be noted that the Si constituent and the Ca constituent as additives are present exclusively in the grain boundary.

It is preferable that $SiO_2$ and $CaCO_3$ are used as the Si constituent and the Ca constituent, respectively. The additive amount of the Si constituent is preferably 0 (not inclusive of 0) to 1.35% by weight, more preferably 0.05 to 0.90% by weight, and furthermore preferably 0.05 to 0.75% by weight, in terms of $SiO_2$.

The present invention includes Ca as a main constituent constituting the ferrite phase as the main phase. Accordingly, when Ca is included as an additive, the amount of Ca as analyzed from the sintered body is the total amount as the sum of the amount in the main phase (referred to as the main constituent as the case may be) and the amount as the additive. Accordingly, as described above, when the Ca constituent is used as an additive, the amount of Ca in the composition formula (1) includes the amount of Ca as an additive. The above-mentioned range of Ca (m) is specified on the basis of the composition determined by the analysis carried out after sintering, and hence is applicable both to the case where the Ca constituent is used as an additive and the case where the Ca constituent is not used as an additive.

The ferrite magnetic material of the present invention may include $Al_2O_3$ and/or $Cr_2O_3$ as additives. $Al_2O_3$ and/or $Cr_2O_3$ has an effect of improving the coercive force. However, $Al_2O_3$ and/or $Cr_2O_3$ tends to decrease the residual magnetic flux density, and hence the content of $Al_2O_3$ and/or $Cr_2O_3$ is preferably set at 3.0% by weight or less. For the purpose of fully displaying the addition effect of $Al_2O_3$ and/or $Cr_2O_3$, it is preferable to set the content thereof at 0.1% by weight or more.

The ferrite magnetic material of the present invention may include $B_2O_3$ as an additive. The inclusion of $B_2O_3$ permits lowering the calcination temperature and the sintering temperature to be advantageous for production. The content of $B_2O_3$ is preferably 0.5% by weight or less of the total weight of the ferrite magnetic material. When the content of $B_2O_3$ is too large, the saturation magnetization becomes low.

The ferrite magnetic material of the present invention preferably does not include alkali metal elements such as Na, K and Rb, but may include such alkali metal elements as impurities. When the contents of these alkali metal elements are derived in terms of the oxides such as $Na_2O$, $K_2O$ and $Rb_2O$, the sum of these contents is preferably 1.0% by weight or less of the whole ferrite sintered body. When these contents are too large, the saturation magnetization becomes low.

In addition to the above, the ferrite magnetic material of the present invention may include, for example, Ga, In, Li, Mg, Ti, Zr, Ge, Sn, V, Nb, Ta, Sb, As, W and Mo as oxides. The contents of these elements in terms of the oxides having stoichiometric compositions are preferably as follows: gallium oxide: 5.0% by weight or less; indium oxide: 3.0% by weight or less; lithium oxide: 1.0% by weight or less; magnesium oxide: 3.0% by weight or less; titanium oxide: 3.0% by weight or less; zirconium oxide: 3.0% by weight or less; germanium oxide: 3.0% by weight or less; tin oxide: 3.0% by weight or less; vanadium oxide: 3.0% by weight or less; niobium oxide: 3.0% by weight or less; tantalum oxide: 3.0% by weight or less; antimony oxide: 3.0% by weight or less; arsine oxide: 3.0% by weight or less; tungsten oxide: 3.0% by weight or less; and molybdenum oxide: 3.0% by weight or less.

The ferrite magnetic material of the present invention can constitute a ferrite sintered magnet. Additionally, the ferrite magnetic material of the present invention can constitute a ferrite magnet powder. The ferrite magnet powder can constitute a bonded magnet by being mixed with a resin. Additionally, the ferrite magnetic material of the present invention can also constitute magnetic recording media and the like as film-like magnetic layers.

When the ferrite magnetic material of the present invention takes a form of a ferrite sintered magnet, the mean grain size thereof is preferably 1.5 µm or less, more preferably 1.0 µm or less, and furthermore preferably 0.2 to 1.0 µm. The grain sizes can be measured with a scanning electron microscope.

The ferrite sintered magnet and the bonded magnet according to the present invention are processed into predetermined shapes, and used in the following wide applications. For example, the magnets can be used as motors for vehicles which drive a fuel pimp, a power window, an ABS (antilock break system), a fan, a wiper, a power steering, an active suspension, a starter, a door lock, an electric mirror, or the like. Moreover, the magnets can also be used as motors for office automation/audio-video equipment, which drive an FDD spindle, a VTR capstan, a VTR rotating head, a VTR reel, a VTR loading, a VTR camera capstan, a VTR camera rotating head, a VTR camera zoom, a VTR camera focus, a radio cassette capstan and other capstans, a CD/DVD/MD spindle, a CD/DVD/MD loading, a CD/DVD light pickup, or the like. Furthermore, the magnets can also be used as motors for household electrical appliances, which drive an air conditioner compressor, a refrigerator compressor, an electric tool, a drier fan, a shaver, an electric toothbrush, or the like. Still further, the magnets can also be used as motors for factory automation equipment, which drive a robot axis, a joint, a robot, a machine tool table, a machine tool belt, or the like. As other applications, the magnets can also preferably be used for a motorcycle generator, a magnet used for speakers/headphones, a magnetron tube, a magnetic field generator for MRI, a CD-ROM clamper, a sensor for distributors, a sensor for ABS, a fuel/oil level sensor, a magnet latch, an isolator, or the like.

When the ferrite magnetic material of the present invention takes a form of a magnet powder, the mean particle size of the powder is preferably set at 0.1 to 5.0 µm. The mean particle size of the powder for a bonded magnet is more preferably 0.1 to 2.0 µm, and furthermore preferably 0.1 to 1.0 µm. When a bonded magnet is produced, a ferrite magnet powder is kneaded with various binders such as resin, metal and rubber, and thereafter, the obtained mixture is compacted in a magnetic field or in the absence of a magnetic field. Preferred as binders are an NBR (acrylonitrile butadiene rubber), chlorinated polyethylene, a polyamide resin and the like. After compacting, curing is made to yield a bonded magnet.

By using the ferrite magnetic material of the present invention, a magnetic recording medium having a magnetic layer can be produced. The magnetic layer includes an M-type ferrite phase in a content of 95 mol % or more. Formation of the magnetic layer can use, for example, the evaporation method and the sputtering method. When the magnetic layer is formed by the sputtering method, the ferrite sintered magnet according to the present invention can also be used as the target. Examples of the magnetic recording medium may include a hard disk, a flexible disk and a magnetic tape.

Next, a preferable method for producing the ferrite magnetic material of the present invention will be described with reference to the sintered magnet.

The method for producing the ferrite sintered magnet according to the present invention includes a mixing step, a calcining step, a pulverizing step, a milling step, a step for compacting in a magnetic field and a sintering step.

<Mixing Step>

In the mixing step, each of the raw material powders are weighed out so as to satisfy the predetermined proportions, and then mixed and pulverized/milled for approximately 1 to 20 hours using a wet attritor, a ball mill or the like. As the starting raw materials, there may be used compounds (for example, $BaCO_3$, $SrCO_3$, $CaCO_3$, $La(OH)_3$, $Fe_2O_3$ and $Co_3O_4$) each containing one of the ferrite constituting elements (Ba, Sr, Ca, La, Fe and Co) or compounds containing two or more of these ferrite constituting elements. As such compounds, there are used oxides or compounds to be converted into oxides by sintering such as carbonates, hydroxides and nitrates. No particular constraints are imposed on the mean particle sizes of the starting raw materials, but usually, the mean particle sizes are preferably set to be approximately 0.1 to 2.0 μm. Not all of the starting raw materials are required to be mixed in the mixing step before calcination, but a part or the whole of each of the compounds may be added after calcination.

<Calcining Step>

The raw material composition obtained in the mixing step is calcined. The calcination is usually carried out in an oxidative atmosphere such as in air. The calcination is carried out at a calcining temperature falling in a temperature range preferably from 1100 to 1450° C., more preferably from 1150 to 1400° C. and furthermore preferably from 1200 to 1350° C. The stable period of time is preferably 1 second to 10 hours, and more preferably 1 second to 3 hours. The substance after calcination usually contains 70% or more of the M phase, and the primary particle size thereof is preferably 10 μm or less and more preferably 2.0 μm or less.

<Pulverizing/Milling Step>

The calcined body is usually granular or agglomerate, and cannot be compacted as it is into a desired shape. Consequently, the calcined body is pulverized/milled. The pulverizing/milling step is necessary for the purpose of mixing the raw material powders, additives and the like for the composition to be adjusted to the desired final composition. A part of the raw materials of the main constituents and a part of the raw materials of the additives can be added in the pulverizing/milling step, and this addition is the posterior addition. The pulverizing/milling step is usually divided into a pulverizing step and a milling step. It is to be noted that by pulverizing/milling the calcined body to a predetermined particle size, a ferrite magnet powder for a bonded magnet can also be prepared.

<Pulverizing Step>

As described above, the calcined body is usually granular or agglomerate, and preferably pulverized. In the pulverizing step, a vibration mill or the like is used, and the treatment is continued until the mean particle size becomes 0.5 to 5.0 μm. It is to be noted that the powder obtained here will be referred to as the pulverized powder.

<Milling Step>

The pulverized powder is milled with a wet attritor, a ball mill, a jet mill or the like until the mean particle size becomes approximately 0.08 to 2.0 μm, preferably 0.1 to 1.0 μm and more preferably 0.2 to 0.8 μm. The specific surface area (obtained on the basis of the BET method) of the obtained milled powder is preferably made to be approximately 7 to 12 $m^2/g$. The milling time depends on the particular milling method, and the milling treatment may be carried out for approximately 30 minutes to 10 hours with a wet attritor and for approximately 10 to 40 hours in a wet milling with a ball mill.

When the milling is carried out, the additives are preferably added. In particular, in the present invention, it is preferable to add $SiO_2$ as the Si constituent and $CaCO_3$ as the Ca constituent. This addition of the additives is carried out for the purpose of improving the sinterability, controlling the magnetic properties, regulating the grain size of the sintered body and performing others.

In the present invention, the posterior additives are preferably added in the milling step. Also, in the present invention, for the purpose of increasing the magnetic orientation degree of the sintered body, a polyhydric alcohol represented by a general formula $C_n(OH)_nH_{n+2}$ is preferably added in the milling step. In this general formula, n representing the number of carbon atoms is preferably 4 to 100, more preferably 4 to 30, furthermore preferably 4 to 20 and yet furthermore preferably 4 to 12. As the polyhydric alcohol, for example, sorbitol is preferable; however, two or more types of polyhydric alcohols may be used in combination. Further, in addition to the polyhydric alcohols, other dispersants well known in the art may also be added.

The above described general formula refers to the case in which the skeleton is exclusively of a straight chain and does not include any unsaturated bond. The number of the hydroxy groups and the number of the hydrogen atoms in the polyhydric alcohol may be somewhat smaller than those indicated by the general formula. In other words, the polyhydric alcohol may include one or more unsaturated bonds as well as the saturated bonds. The fundamental skeleton of the polyhydric alcohol may be either of a straight chain or cyclic, but is preferably of a straight chain. When the number of the hydroxy groups is 50% or more of the number n of the carbon atoms, the advantageous effects of the present invention can be attained, but the larger number of the hydroxy groups is more preferable, and it is most preferable that the number of the hydroxy groups is approximately the same as the number of the carbon atoms. The additive amount of the polyhydric alcohol may be set to be approximately 0.05 to 5.0% by weight, preferably approximately 0.1 to 3.0% by weight, and more preferably approximately 0.3 to 2.0% by weight in relation to the object of the addition. It may be noted that the added polyhydric alcohol is thermally decomposed to be removed in the sintering step to be carried out after the step for compacting in a magnetic field.

The milling step is divided into a first milling step and a second milling step as shown below, and a powder heat treatment step can also be carried out between the firs milling step and the second milling step.

<First Milling Step>

In the first milling step, the coarse powder is milled to a mean particle size of 0.08 to 0.8 μm, preferably 0.1 to 0.4 μm, and more preferably 0.1 to 0.2 am, by means of wet or dry milling with an attritor, a ball mill, a jet mill or the like. The first milling step is carried out for the purpose of making the coarse powder disappear and further for the purpose of making fine the structure after the sintering in order to improve the magnetic properties, and the specific surface area (based on the BET method) to be obtained is preferably to fall within a range from 20 to 25 $m^2/g$.

When the pulverized powder is subjected to wet milling with a ball mill, the treating time of 60 to 100 hours per 200 g of the pulverized powder may be sufficient, although the treatment time depends on the adopted milling technique.

For the purpose of improving the coercive force and controlling the grain size, the $CaCO_3$ and $SiO_2$ powders, or further, the $SrCO_3$ powder, the $BaCO_3$ powder and the like may be added in advance of the first milling step.

<Powder Heat Treatment Step>

In the powder heat treatment step, the fine powder obtained in the first milling is subjected to a heat treatment in which the fine powder is retained at 600 to 1200° C., more preferably at 700 to 1000° C. for 1 second to 100 hours.

By carrying out the first milling step, ultrafine powders less than 0.1 µm in particle size are inevitably generated. The presence of such ultrafine powders sometimes causes troubles in the subsequent step for compacting in a magnetic field. For example, when the amounts of the ultrafine powders are large in wet compacting, there occur troubles such as unsuccessful compacting because of poor water releasability. Accordingly, in the present embodiment, a heat treatment is carried out in advance of the step for compacting in a magnetic field. Specifically, the heat treatment is carried out for the purpose of reducing the amounts of the ultrafine powders by reacting the ultrafine powders less than 0.1 µm, generated in the first milling, with fine powders of 0.1 µm or more in particle size (for example, fine powders of 0.1 to 0.2 µm). The ultrafine powders are reduced in amounts by this heat treatment, and the compactibility can thereby be improved. As for the heat treatment atmosphere, the heat treatment may be carried out in an atmosphere of air.

<Second Milling Step>

In the successive second milling step, the heat treated, milled powder is wet or dry milled with an attritor, a ball mill, a jet mill or the like, to a mean particle size of 0.8 µm or less, preferably 0.1 to 0.4 µm, and more preferably 0.1 to 0.2 µm. The second milling step is carried out for the purpose of controlling the particle size, removing necking, and improving the dispersion of the additives, and the specific surface area (based on the BET method) preferably falls within a range from 10 to 20 $m^2/g$, and more preferably from 10 to 15 $m^2/g$. When the specific surface area is controlled to fall within the above described ranges, the amount of the ultrafine particles is small even when the ultrafine particles are present, so that there are no adverse effects on the compactibility. In other words, by carrying out the first milling step, the powder heat treatment step and the second milling step, there is satisfied the requirement that the structure after sintering be made fine without causing adverse effects on the compactibility.

When the milled powder is subjected to wet milling with a ball mill, the treating time of 10 to 40 hours per 200 g of the milled powder may be sufficient, although the treatment time depends on the adopted milling technique. The second milling step is usually relaxed in milling conditions as compared to the first milling step, because if the second milling step is carried out under the conditions comparable to those for the first milling step, ultrafine powders are generated again, and the desired particle size is essentially attained in the first milling step. Whether the milling conditions are relaxed or not may be determined by referring to the mechanical energy applied to the milling as well as the milling time.

For the purpose of improving the coercive force and controlling the grain size, the $CaCO_3$ and $SiO_2$ powders, or further, the $SrCO_3$ powder, the $BaCO_3$ powder and the like may be added in advance of the second milling step.

<Step for Compacting in a Magnetic Field>

The step for compacting in a magnetic field can be carried out either by dry compacting or by wet compacting, but is preferably carried out by wet compacting for the purpose of increasing the magnetic orientation degree.

When the wet compacting is carried out, the milling step is carried out in a wet manner, and the slurry thus obtained is concentrated to a predetermined concentration to prepare a slurry for wet compacting. Such concentration can be carried out with a centrifugal separator, a filter press or the like. In this case, the milled powder preferably accounts for approximately 30 to 80% by weight of the slurry for wet compacting. Additionally, water is preferable as a dispersing medium, and is preferably added with surfactants such as gluconic acid and/or gluconate, and sorbitol. Then, compacting in a magnetic field is carried out with the slurry for wet compacting. The compacting pressure may be approximately 0.1 to 0.5 ton/$cm^2$, and the applied magnetic field may be approximately 5 to 15 kOe. The dispersing medium is not limited to water, but nonaqueous solvents may also be used. When a nonaqueous dispersing medium is used, organic solvents such as toluene and xylene may be used. In this case, a surfactant such as oleic acid is preferably added.

<Sintering Step>

The compacted body thus obtained is sintered to yield a sintered body. The sintering is usually carried out in an oxidative atmosphere such as in air. The ferrite magnetic material according to the present invention is characterized in that even a sintering thereof at temperatures of 1150° C. or lower can attain a Br+(⅓)HcJ value of 6200 or more. From the viewpoint of energy saving, the sintering temperature is preferably set at 1150° C. or lower. However, the present invention does not exclude the sintering at temperatures exceeding 1150° C. Accordingly, the sintering temperature may be appropriately selected within a range from 1080 to 1200° C., and preferably within a range from 1100 to 1150° C. Additionally, the period of time in which the temperature is retained at the sintering temperature (stable temperature) may be set to be approximately 0.5 to 3 hours.

When the compacted body has been obtained by wet compacting, if the compacted body is not sufficiently dried and is rapidly heated as it is, there is a possibility that cracking is caused in the compacted body. When wet compacting has been applied, it is preferable to suppress the incidence of cracking by sufficiently drying the compacted body by increasing the temperature from room temperature to approximately 100° C. in such a way that the temperature increase rate is set to be as slow as, for example, approximately 10° C./hour. When a surfactant (dispersant) or the like is added, it is preferable to sufficiently remove the dispersant by carrying out a degreasing treatment within a temperature range approximately from 100 to 500° C. in such a way that the temperature increase rate is set to be, for example, approximately 2.5° C./hour.

EXAMPLE 1

As the starting raw materials, lanthanum hydroxide (La(OH)$_3$), barium carbonate (BaCO$_3$), calcium carbonate (CaCO$_3$), strontium carbonate (SrCO$_3$), ferric oxide (Fe$_2$O$_3$) and cobalt oxide (CO$_3$O$_4$) were prepared. These starting raw materials constituting the main constituents were weighed out to satisfy the following composition formulas (a) to (h) (in molar ratios) with respect to the main constituents after sintering exclusive of oxygen. The weighed main constituents are shown in Table 1. It is to be noted that Table 1 also shows the values of x, y, z and others in the above described composition formula (1).

$La_{0.7}Ca_mSr_{0.3-m}Fe_{10.93}Co_{0.47}$ Composition formula (a)

m=0.05, 0.15, 0.20, 0.25, 0.3

$La_{0.65}Ca_mSr_{0.35-m}Fe_{10.97}Co_{0.43}$ Composition formula (b)

m=0.15, 0.25, 0.3, 0.4

$La_{0.6}Ca_mSr_{0.4-m}Fe_{11.00}Co_{0.40}$ Composition formula (c)

m=0, 0.15, 0.2, 0.3, 0.375, 0.4

$La_{0.55}Ca_mSr_{0.45-m}Fe_{11.03}Co_{0.37}$ Composition formula (d)

m=0.18, 0.25, 0.3, 0.35, 0.42

$La_{0.5}Ca_mSr_{0.5-m}Fe_{11.10}Co_{0.30}$ Composition formula (e)

m=0.20, 0.30, 0.40, 0.50

$La_{0.45}Ca_mBa_{0.1}Sr_{0.45-m}Fe_{11.50}Co_{0.30}$ Composition formula (f)

m=0, 0.05, 0.15, 0.25, 0.35

$La_{0.3}Ca_mSr_{0.7-m}Fe_{11.80}Co_{0.20}$ Composition formula (g)

m=0

$La_{0.12}Ca_mSr_{0.88-m}Fe_{11.92}Co_{0.08}$ Composition formula (h)

m=0, 0.044, 0.088, 0.176, 0.264, 0.352

The above described raw materials were mixed and pulverized with a wet attritor to yield slurry-like raw material compositions. These slurries were dried, and after calcined in air at 1350° C. (composition formula (c)), at 1300° C. (composition formulas (a), (b), (d), (e), (g)), at 1250° C. (composition formula (f)) or at 1200° C. (composition formula (h)) for 3 hours. The calcined bodies thus obtained were pulverized with a rod vibration mill.

The subsequent milling was carried out with a ball mill in two steps. The first milling step was such that a pulverized powder was treated for 88 hours with water added thereto. After the first milling step, the milled powders were heat treated in air at 800° C.

Subsequently, the heat treated powders were added with water and sorbitol, and further with $SiO_2$ in 0.60% by weight and $CaCO_3$ in 1.40% by weight, both as additives; and the thus treated powders were subjected to the second milling in which the powders were treated with a wet ball mill for 25 hours.

The solid content concentrations of the obtained milled slurries were regulated, and by using a wet magnetic-field compacting machine, columnar compacted bodies of 30 mm in diameter and 15 mm in thickness were obtained in an applied magnetic field of 12 kOe. The compacted bodies were sufficiently dried in air at room temperature, and subsequently, subjected to a sintering in which the compacted bodies were retained in air at the temperatures shown in Table 2 for one hour.

The composition (La, Ca, Ba, Sr, Fe and Co) of each of the obtained sintered bodies was measured by means of fluorescent X-ray quantitative analysis. Additionally, the upper and

TABLE 1

| Sample No. | La x | Ca m | $\alpha$ 1 − x − m | | Fe (12 − y)*z | Co yz | z | y | La/Co x/yz |
|---|---|---|---|---|---|---|---|---|---|
| | | | Sr | Ba | | | | | |
| 1 | 0.7 | 0.05 | 0.25 | 0 | 10.93 | 0.47 | 0.95 | 0.49 | 1.50 |
| 2 | 0.7 | 0.15 | 0.15 | 0 | 10.93 | 0.47 | 0.95 | 0.49 | 1.50 |
| 3 | 0.7 | 0.2 | 0.1 | 0 | 10.93 | 0.47 | 0.95 | 0.49 | 1.50 |
| 4 | 0.7 | 0.25 | 0.05 | 0 | 10.93 | 0.47 | 0.95 | 0.49 | 1.50 |
| 5 | 0.7 | 0.3 | 0 | 0 | 10.93 | 0.47 | 0.95 | 0.49 | 1.50 |
| 6 | 0.65 | 0.15 | 0.2 | 0 | 10.97 | 0.43 | 0.95 | 0.46 | 1.50 |
| 7 | 0.65 | 0.25 | 0.1 | 0 | 10.97 | 0.43 | 0.95 | 0.46 | 1.50 |
| 8 | 0.65 | 0.3 | 0.05 | 0 | 10.97 | 0.43 | 0.95 | 0.46 | 1.50 |
| 9 | 0.65 | 0.4 | 0 | 0 | 10.97 | 0.43 | 0.95 | 0.46 | 1.50 |
| 10 | 0.6 | 0 | 0.4 | 0 | 11.00 | 0.40 | 0.95 | 0.42 | 1.50 |
| 11 | 0.6 | 0.15 | 0.25 | 0 | 11.00 | 0.40 | 0.95 | 0.42 | 1.50 |
| 12 | 0.6 | 0.2 | 0.2 | 0 | 11.00 | 0.40 | 0.95 | 0.42 | 1.50 |
| 13 | 0.6 | 0.3 | 0.1 | 0 | 11.00 | 0.40 | 0.95 | 0.42 | 1.50 |
| 14 | 0.6 | 0.375 | 0.025 | 0 | 11.00 | 0.40 | 0.95 | 0.42 | 1.50 |
| 15 | 0.6 | 0.4 | 0 | 0 | 11.00 | 0.40 | 0.95 | 0.42 | 1.50 |
| 16 | 0.55 | 0.18 | 0.27 | 0 | 11.03 | 0.37 | 0.95 | 0.39 | 1.50 |
| 17 | 0.55 | 0.25 | 0.2 | 0 | 11.03 | 0.37 | 0.95 | 0.39 | 1.50 |
| 18 | 0.55 | 0.3 | 0.15 | 0 | 11.03 | 0.37 | 0.95 | 0.39 | 1.50 |
| 19 | 0.55 | 0.35 | 0.1 | 0 | 11.03 | 0.37 | 0.95 | 0.39 | 1.50 |
| 20 | 0.55 | 0.42 | 0.03 | 0 | 11.03 | 0.37 | 0.95 | 0.39 | 1.50 |
| 21 | 0.5 | 0.2 | 0.3 | 0 | 11.10 | 0.30 | 0.95 | 0.32 | 1.67 |
| 22 | 0.5 | 0.3 | 0.2 | 0 | 11.10 | 0.30 | 0.95 | 0.32 | 1.67 |
| 23 | 0.5 | 0.4 | 0.1 | 0 | 11.10 | 0.30 | 0.95 | 0.32 | 1.67 |
| 24 | 0.5 | 0.5 | 0 | 0 | 11.10 | 0.30 | 0.95 | 0.32 | 1.67 |
| 25 | 0.45 | 0 | 0.45 | 0.1 | 11.50 | 0.30 | 0.98 | 0.31 | 1.50 |
| 26 | 0.45 | 0.05 | 0.4 | 0.1 | 11.50 | 0.30 | 0.98 | 0.31 | 1.50 |
| 27 | 0.45 | 0.15 | 0.3 | 0.1 | 11.50 | 0.30 | 0.98 | 0.31 | 1.50 |
| 28 | 0.45 | 0.25 | 0.2 | 0.1 | 11.50 | 0.30 | 0.98 | 0.31 | 1.50 |
| 29 | 0.45 | 0.35 | 0.1 | 0.1 | 11.50 | 0.30 | 0.98 | 0.31 | 1.50 |
| 30 | 0.3 | 0 | 0.7 | 0 | 11.80 | 0.20 | 1.00 | 0.20 | 1.50 |
| 31 | 0.3 | 0 | 0.7 | 0 | 11.80 | 0.20 | 1.00 | 0.20 | 1.50 |
| 32 | 0.12 | 0 | 0.88 | 0 | 11.92 | 0.08 | 1.00 | 0.08 | 1.50 |
| 33 | 0.12 | 0.044 | 0.836 | 0 | 11.92 | 0.08 | 1.00 | 0.08 | 1.50 |
| 34 | 0.12 | 0.088 | 0.792 | 0 | 11.92 | 0.08 | 1.00 | 0.08 | 1.50 |
| 35 | 0.12 | 0.176 | 0.704 | 0 | 11.92 | 0.08 | 1.00 | 0.08 | 1.50 |
| 36 | 0.12 | 0.264 | 0.616 | 0 | 11.92 | 0.08 | 1.00 | 0.08 | 1.50 |
| 37 | 0.12 | 0.352 | 0.528 | 0 | 11.92 | 0.08 | 1.00 | 0.08 | 1.50 | lower surfaces of each of the columnar sintered bodies thus obtained were processed, and then the residual magnetic flux density (Br) and the coercive force (HcJ) were measured by use of a B-H tracer with a maximum applied magnetic field of 25 kOe. It is to be noted that the measurements of the residual magnetic flux density (Br) and the coercive force (HcJ) were carried out at normal temperature (25° C.). This is also the case below. The phases of each of the obtained sintered bodies were analyzed by means of X-ray diffraction under the above described conditions to identify the proportion of the M-type ferrite phase. The results thus obtained are shown in Table 2. FIG. 1 also shows the relation between the measured residual magnetic flux densities (Br) and the measured coercive forces (HcJ). It is to be noted that FIG. 1 is presented under the conditions that the residual magnetic flux densities (Br)≧4000 G and the coercive force (HcJ)≧4500 Oe, so that FIG. 1 excludes the plots of those samples which have lower magnetic properties not to satisfy the above-mentioned conditions. Also in FIG. 1, the properties lower than the line L1 indicating that Br+($\frac{1}{3}$)HcJ=6200 are plotted with marks x and the properties equal to or higher than the line L1 indicating that Br+($\frac{1}{3}$)HcJ=6200 are plotted with marks ○. The numerals attached to the marks indicate Sample Nos. The sintered bodies plotted with the marks ○ each satisfy the conditions that Br≧4200 G and HcJ≧5000 Oe.

As shown in Table 2 and FIG. 1, it was found that Sample Nos. 3, 4, 7, 8, 12 to 14, and 17 to 19 sintered at 1140° C. each attained such properties that a Br+($\frac{1}{3}$)HcJ value of 6200 or more. In particular, it was found that Sample Nos. 4, 8 and 13 each attained such properties that Br+($\frac{1}{3}$)HcJ value of 6300 or more.

Figure 14:
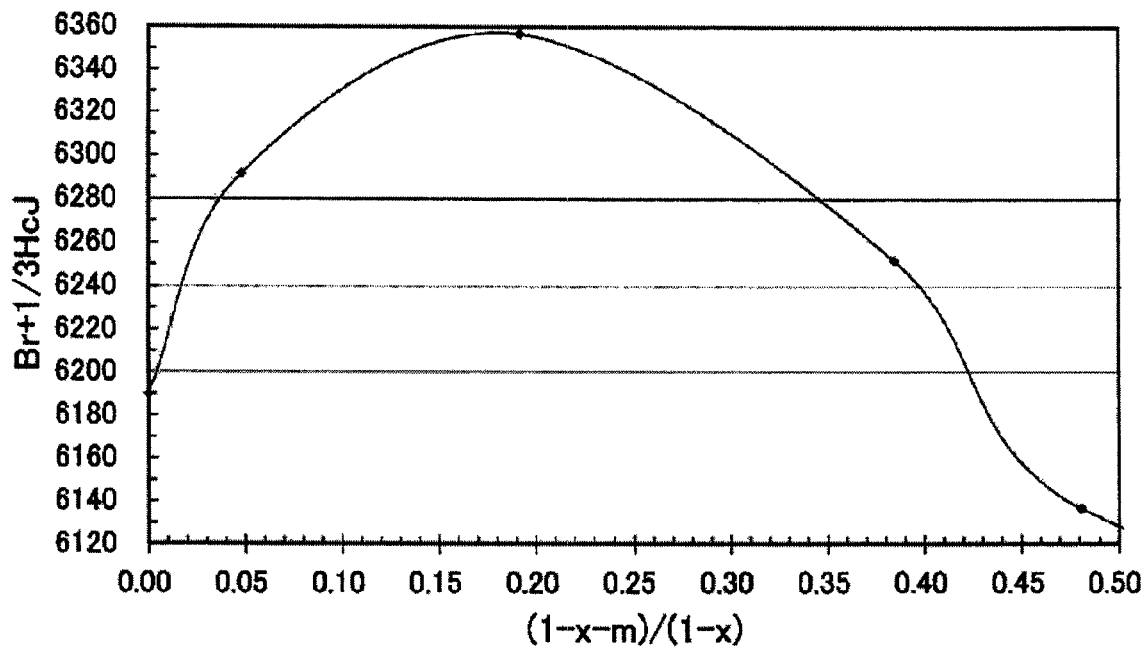
FIG. 14 is a graph showing the relation between (1−x−m)/(1−x) and Br+(⅓)HcJ.

FIG. 14 is a graph showing the relation between $(1-x-m)/(1-x)$ and Br+($\frac{1}{3}$)HcJ.

As can be seen from Table 2 and FIG. 14, the sintered bodies attain the Br+($\frac{1}{3}$)HcJ values of 6200 or more when $(1-x-m)/(1-x)$ falls within a range between 0.0005 and 0.42.

Figure 2:
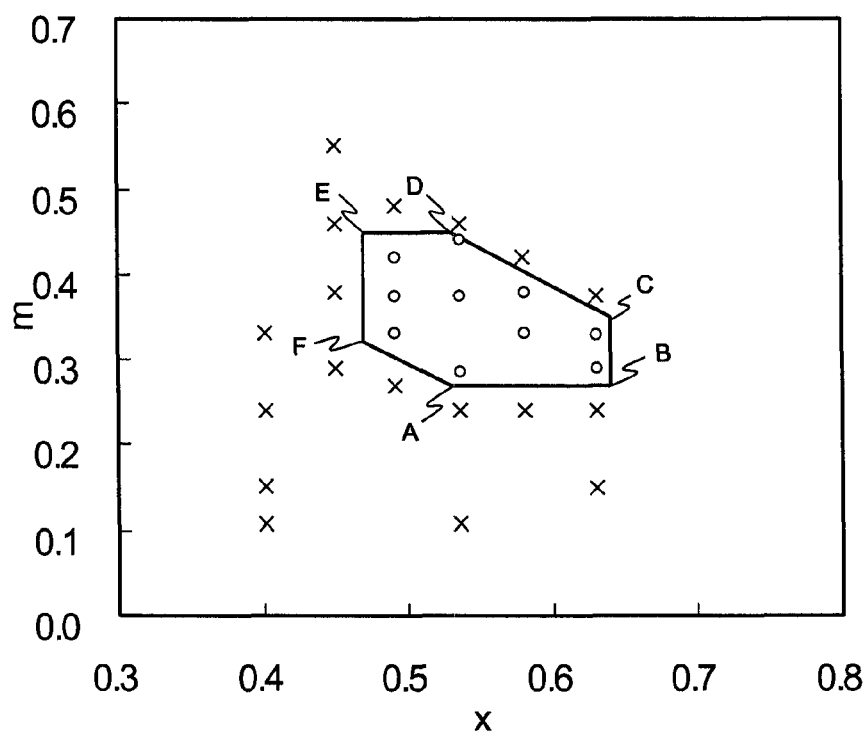
FIG. 2 is a graph in which Samples Nos. 1 to 29 are plotted in the (x, m) coordinates in Example 1.

Next, in FIG. 2, a plot similar to that shown in FIG. 1 is presented in the (x, m) coordinates in which the abscissa is x representing the amount of La and the ordinate is m representing the amount of Ca. The meanings of the marks ○ and x are the same as in FIG. 1. In FIG. 2, the region enclosing the plotted points of Sample Nos. 3, 4, 7, 8, 12 to 14, and 17 to 19 is specified by the line segments connecting the points A: (0.53, 0.27), B: (0.64, 0.27), C: (0.64, 0.35), D: (0.53, 0.45), E: (0.47, 0.45) and F: (0.47, 0.32) in the (x, m) coordinates. Accordingly, in the present invention, x representing the amount of La and m representing the amount of Ca in the following composition formula (1) were set to be the values falling in the region bounded by the points A: (0.53, 0.27), B:

TABLE 2

| Sample No. | La x | Ca m | α 1−x−m Sr | α 1−x−m Ba | Fe (12−y)*z | Co yz | z | y | La/Co x/yz | (1−x−m)/(1−x) | Br G | HcJ Oe | Hk/HcJ | Br + 1/3HcJ | M phase proportion % | Sintering temp. ° C. |
|---|---|---|---|---|---|---|---|---|---|---|---|---|---|---|---|---|
| 1 | 0.63 | 0.15 | 0.22 | 0 | 9.76 | 0.42 | 0.85 | 0.49 | 1.50 | 0.60 | 4200 | 4001 | 91 | 5534 | 100 | 1140 |
| 2 | 0.63 | 0.24 | 0.13 | 0 | 9.76 | 0.42 | 0.85 | 0.49 | 1.50 | 0.36 | 4285 | 5189 | 92 | 6015 | 100 | 1140 |
| 3 | 0.63 | 0.29 | 0.09 | 0 | 9.76 | 0.42 | 0.85 | 0.49 | 1.50 | 0.24 | 4421 | 5386 | 91 | 6216 | 100 | 1140 |
| 4 | 0.63 | 0.33 | 0.04 | 0 | 9.76 | 0.42 | 0.85 | 0.49 | 1.50 | 0.12 | 4314 | 5992 | 91 | 6311 | 100 | 1140 |
| 5 | 0.63 | 0.38 | 0.00 | 0 | 9.76 | 0.42 | 0.85 | 0.49 | 1.50 | 0.00 | 4245 | 5469 | 91 | 6068 | 100 | 1140 |
| 6 | 0.58 | 0.24 | 0.18 | 0 | 9.79 | 0.38 | 0.85 | 0.45 | 1.51 | 0.43 | 4293 | 5516 | 91 | 6132 | 100 | 1140 |
| 7 | 0.58 | 0.33 | 0.09 | 0 | 9.79 | 0.39 | 0.85 | 0.46 | 1.50 | 0.21 | 4374 | 5588 | 93 | 6237 | 100 | 1140 |
| 8 | 0.58 | 0.38 | 0.04 | 0 | 9.79 | 0.39 | 0.85 | 0.46 | 1.50 | 0.11 | 4255 | 6299 | 92 | 6355 | 92 | 1140 |
| 9 | 0.58 | 0.42 | 0.00 | 0 | 9.79 | 0.39 | 0.85 | 0.46 | 1.50 | 0.00 | 4150 | 5850 | 91 | 6100 | 90 | 1140 |
| 10 | 0.54 | 0.11 | 0.36 | 0 | 9.82 | 0.36 | 0.85 | 0.42 | 1.50 | 0.77 | 3658 | 7218 | 94 | 6064 | 93 | 1140 |
| 11 | 0.54 | 0.24 | 0.22 | 0 | 9.82 | 0.36 | 0.85 | 0.42 | 1.50 | 0.48 | 4301 | 5507 | 92 | 6137 | 96 | 1140 |
| 12 | 0.54 | 0.29 | 0.18 | 0 | 9.82 | 0.36 | 0.85 | 0.42 | 1.50 | 0.38 | 4355 | 5691 | 91 | 6252 | 100 | 1140 |
| 13 | 0.54 | 0.38 | 0.09 | 0 | 9.82 | 0.36 | 0.85 | 0.42 | 1.50 | 0.19 | 4382 | 5924 | 92 | 6357 | 100 | 1140 |
| 14 | 0.54 | 0.44 | 0.02 | 0 | 9.82 | 0.36 | 0.85 | 0.42 | 1.50 | 0.05 | 4317 | 5924 | 91 | 6292 | 100 | 1140 |
| 15 | 0.54 | 0.46 | 0.00 | 0 | 9.82 | 0.36 | 0.85 | 0.42 | 1.50 | 0.00 | 4248 | 5825 | 91 | 6190 | 92 | 1140 |
| 16 | 0.49 | 0.27 | 0.24 | 0 | 9.85 | 0.33 | 0.85 | 0.39 | 1.49 | 0.47 | 4358 | 5050 | 91 | 6041 | 95 | 1140 |
| 17 | 0.49 | 0.33 | 0.18 | 0 | 9.85 | 0.33 | 0.85 | 0.39 | 1.50 | 0.35 | 4538 | 5186 | 91 | 6267 | 100 | 1140 |
| 18 | 0.49 | 0.38 | 0.13 | 0 | 9.85 | 0.33 | 0.85 | 0.39 | 1.50 | 0.26 | 4508 | 5171 | 92 | 6232 | 100 | 1140 |
| 19 | 0.49 | 0.42 | 0.09 | 0 | 9.85 | 0.33 | 0.85 | 0.39 | 1.50 | 0.18 | 4458 | 5260 | 93 | 6211 | 100 | 1140 |
| 20 | 0.49 | 0.48 | 0.03 | 0 | 9.85 | 0.33 | 0.85 | 0.39 | 1.50 | 0.05 | 4120 | 5110 | 93 | 5823 | 1000 | 1140 |
| 21 | 0.45 | 0.29 | 0.27 | 0 | 9.91 | 0.27 | 0.88 | 0.31 | 1.67 | 0.48 | 4150 | 4350 | 93 | 5600 | 93 | 1140 |
| 22 | 0.45 | 0.38 | 0.18 | 0 | 9.91 | 0.27 | 0.88 | 0.31 | 1.67 | 0.32 | 4230 | 4563 | 92 | 5751 | 100 | 1140 |
| 23 | 0.45 | 0.46 | 0.09 | 0 | 9.91 | 0.27 | 0.88 | 0.31 | 1.67 | 0.16 | 4456 | 4750 | 92 | 6039 | 100 | 1140 |
| 24 | 0.45 | 0.55 | 0.00 | 0 | 9.91 | 0.27 | 0.85 | 0.32 | 1.67 | 0.00 | 4554 | 4449 | 93 | 6037 | 100 | 1140 |
| 25 | 0.40 | 0.11 | 0.40 | 0.09 | 10.27 | 0.27 | 0.88 | 0.31 | 1.50 | 0.82 | 4341 | 4866 | 92 | 5963 | 100 | 1140 |
| 26 | 0.40 | 0.15 | 0.36 | 0.09 | 10.27 | 0.27 | 0.88 | 0.31 | 1.50 | 0.75 | 4559 | 4620 | 91 | 6099 | 100 | 1140 |
| 27 | 0.40 | 0.24 | 0.27 | 0.09 | 10.27 | 0.27 | 0.88 | 0.31 | 1.50 | 0.60 | 4430 | 5019 | 91 | 6103 | 100 | 1140 |
| 28 | 0.40 | 0.33 | 0.18 | 0.09 | 10.27 | 0.27 | 0.88 | 0.31 | 1.50 | 0.45 | 4420 | 5021 | 92 | 6094 | 100 | 1140 |
| 29 | 0.40 | 0.42 | 0.09 | 0.09 | 10.27 | 0.27 | 0.88 | 0.31 | 1.50 | 0.30 | 4180 | 4339 | 93 | 5626 | 100 | 1140 |
| 30 | 0.27 | 0.11 | 0.63 | 0 | 10.54 | 0.18 | 0.89 | 0.20 | 1.50 | 0.85 | 4379 | 4266 | 94 | 5801 | 100 | 1160 |
| 31 | 0.27 | 0.11 | 0.63 | 0 | 10.54 | 0.18 | 0.89 | 0.20 | 1.50 | 0.85 | 4438 | 4527 | 92 | 5947 | 100 | 1200 |
| 32 | 0.11 | 0.11 | 0.79 | 0 | 10.64 | 0.07 | 0.89 | 0.08 | 1.50 | 0.88 | 4302 | 4383 | 91 | 5763 | 100 | 1180 |
| 33 | 0.11 | 0.15 | 0.75 | 0 | 10.64 | 0.07 | 0.89 | 0.08 | 1.50 | 0.84 | 4291 | 4273 | 92 | 5715 | 100 | 1180 |
| 34 | 0.11 | 0.19 | 0.71 | 0 | 10.64 | 0.07 | 0.89 | 0.08 | 1.50 | 0.79 | 4275 | 4148 | 92 | 5658 | 100 | 1180 |
| 35 | 0.11 | 0.26 | 0.63 | 0 | 10.64 | 0.07 | 0.89 | 0.08 | 1.50 | 0.70 | 4174 | 3693 | 92 | 5405 | 100 | 1180 |
| 36 | 0.11 | 0.34 | 0.55 | 0 | 10.64 | 0.07 | 0.89 | 0.08 | 1.50 | 0.62 | 2703 | 3333 | 93 | 3814 | 100 | 1180 |
| 37 | 0.11 | 0.42 | 0.47 | 0 | 10.64 | 0.07 | 0.89 | 0.08 | 1.50 | 0.53 | 2645 | 3034 | 92 | 3656 | 100 | 1180 |

(0.64, 0.27), C: (0.64, 0.35), D: (0.53, 0.45), E: (0.47, 0.45) and F: (0.47, 0.32) in the (x, m) coordinates.

From the above described facts, it is interpreted that the inclusion of a predetermined amount of Ca on the A site in addition to α (Ba, Sr) yields a La-based hexagonal ferrite in which the amount of La solid solution in the hexagonal ferrite phase is large and such inclusion of Ca contributes to the improvement of the magnetic properties.

Figure 3:
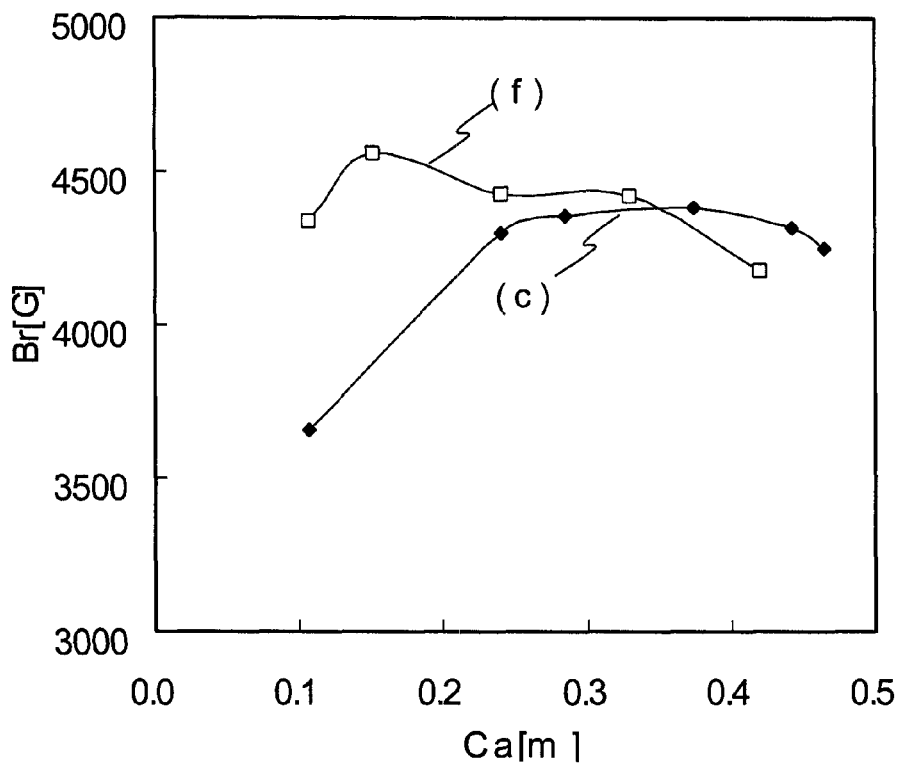
FIG. 3 is a graph showing the relation between the amount of Ca (m) and the residual magnetic flux density (Br) in Example 1.
Figure 4:
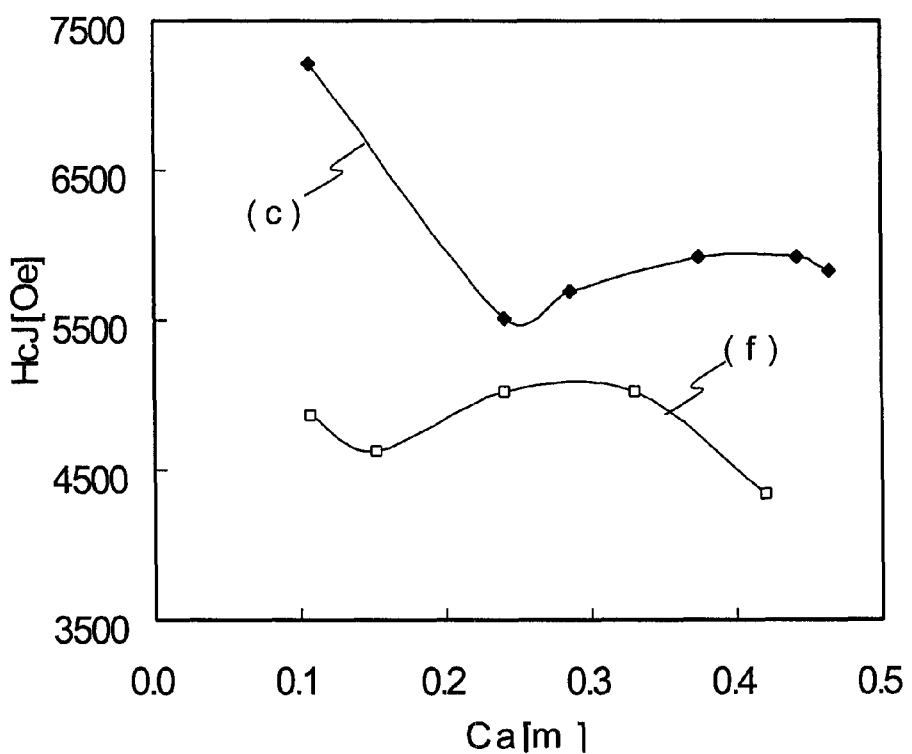
FIG. 4 is a graph showing the relation between the amount of Ca (m) and the coercive force (HcJ) in Example 1.

FIG. 3 shows the relations between the amount of Ca (m) and the residual magnetic flux density (Br) in the sintered bodies represented by the above described composition formulas (c) and (f). FIG. 4 shows the relation between the amount of Ca (m) and the coercive force (HcJ) in the sintered bodies represented by the above described composition formulas (c) and f). On the basis of FIGS. 3 and 4, for the purpose of attaining a high residual magnetic flux density (Br) and a high coercive force (HcJ), it is preferable that m(Ca) be set at 0.25 to 0.45.

EXAMPLE 2

As the starting raw materials, lanthanum hydroxide (La(OH)$_3$), calcium carbonate (CaCO$_3$), strontium carbonate (SrCO$_3$), ferric oxide (Fe$_2$O$_3$) and cobalt oxide (CO$_3$O$_4$) were prepared. These starting raw materials constituting the main constituents were weighed out to satisfy the following formula (i) (in molar ratios) with respect to the main constituents after sintering exclusive of oxygen. The weighed main constituents are shown in Table 3. It is to be noted that Table 3 also shows the values of x, y, z and others in the above described composition formula (1).

$La_{0.6}Ca_{0.3}Sr_{0.1}Fe_{11.40-yz}Co_{yz}$  Formula (i)

x/yz: 3.00, 2.00, 1.71, 1.50, 1.20, 1.00

TABLE 3

| Sample No. | La x | Ca m | Sr 1 − x − m | Fe (12 − y)*z | Co yz | z | y | La/Co x/yz |
|---|---|---|---|---|---|---|---|---|
| 40 | 0.6 | 0.3 | 0.1 | 11.20 | 0.2 | 0.95 | 0.21 | 3.00 |
| 41 | 0.6 | 0.3 | 0.1 | 11.10 | 0.30 | 0.95 | 0.32 | 2.00 |
| 42 | 0.6 | 0.3 | 0.1 | 11.05 | 0.35 | 0.95 | 0.37 | 1.71 |
| 43 | 0.6 | 0.3 | 0.1 | 11.00 | 0.40 | 0.95 | 0.42 | 1.50 |
| 44 | 0.6 | 0.3 | 0.1 | 10.90 | 0.50 | 0.95 | 0.53 | 1.20 |
| 45 | 0.6 | 0.3 | 0.1 | 10.80 | 0.60 | 0.95 | 0.63 | 1.00 |

The above described raw materials were mixed and pulverized with a wet attritor to yield slurry-like raw material compositions. These slurries were dried, and thereafter calcined in air at 1350° C. for 3 hours.

The calcined bodies thus obtained were pulverized with a rod vibration mill.

The subsequent milling was carried out with a ball mill in two steps. The first milling step was such that a pulverized powder was treated for 88 hours with water added thereto. After the first milling step, the milled powders were heat treated in the atmosphere of air at 800° C.

Subsequently, the heat treated powders were added with water and sorbitol, and further with SiO$_2$ in 0.60% by weight and CaCO$_3$ in 1.40% by weight, both as additives; and the thus treated powders were subjected to the second milling in which the powders were treated with a wet ball mill for 25 hours.

The solid content concentrations of the obtained milled slurries were regulated, and by using a wet magnetic-field compacting machine, columnar compacted bodies of 30 mm in diameter and 15 mm in thickness were obtained in an applied magnetic field of 12 kOe. The compacted bodies were sufficiently dried in air at room temperature, and subsequently, subjected to a sintering in which the compacted bodies were retained in air at 1140° C. for one hour.

The composition (Sr, La, Ca, Fe and Co) of each of the obtained sintered bodies was measured by means of fluorescent X-ray quantitative analysis. Additionally, the upper and lower surfaces of each of the columnar sintered bodies thus obtained were processed, and then the residual magnetic flux density (Br) and the coercive force (HcJ) were measured by use of a B-H tracer with a maximum applied magnetic field of 25 kOe. As for the coercive force (HcJ), measurements were made in a temperature range of −40 to 20° C. to derive the coercive force (HcJ) temperature property. The phases of each of the obtained sintered bodies were analyzed by means of X-ray diffraction under the above described conditions to identify the proportion of the M-type ferrite phase. The results thus obtained are shown in Table 4.

Figure 5:
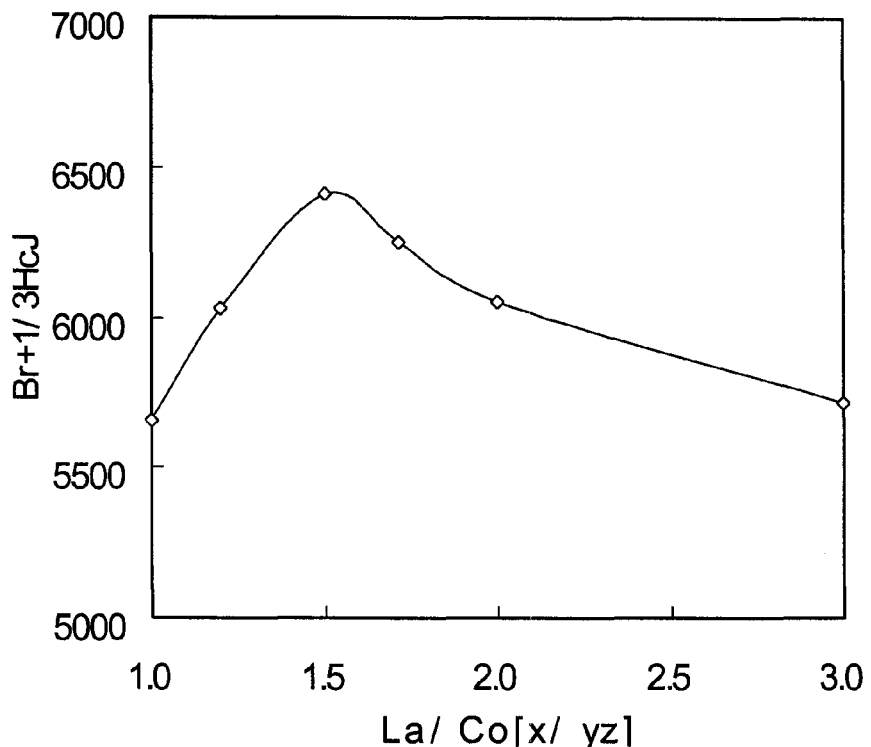
FIG. 5 is a graph showing the relation between the ratio (x/yz) of the La to Co and Br+(⅓)HcJ in Example 2.
Figure 6:
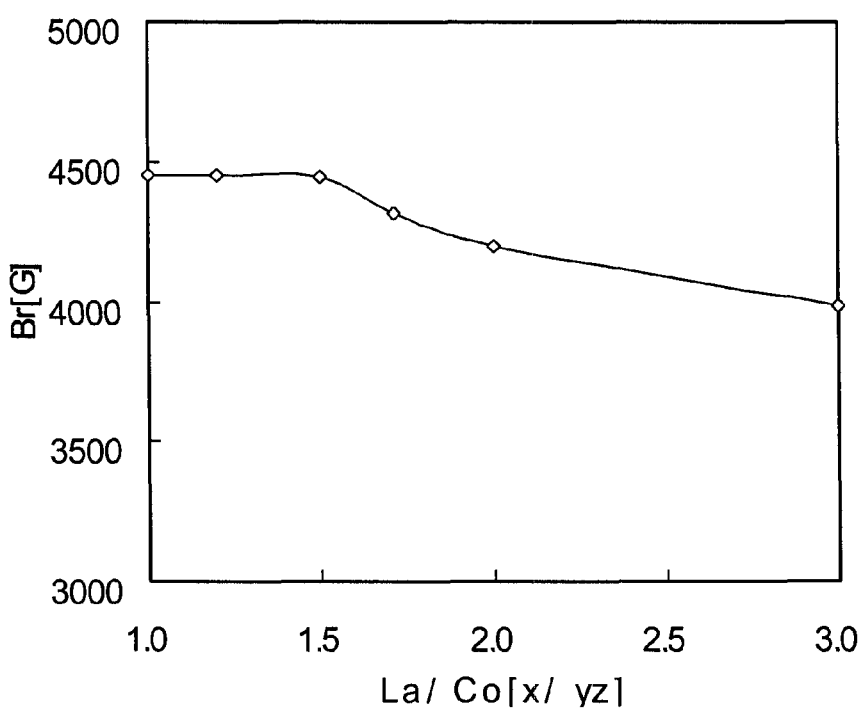
FIG. 6 is a graph showing the relation between La/Co (x/yz) and the residual magnetic flux density (Br) in Example 2.
Figure 7:
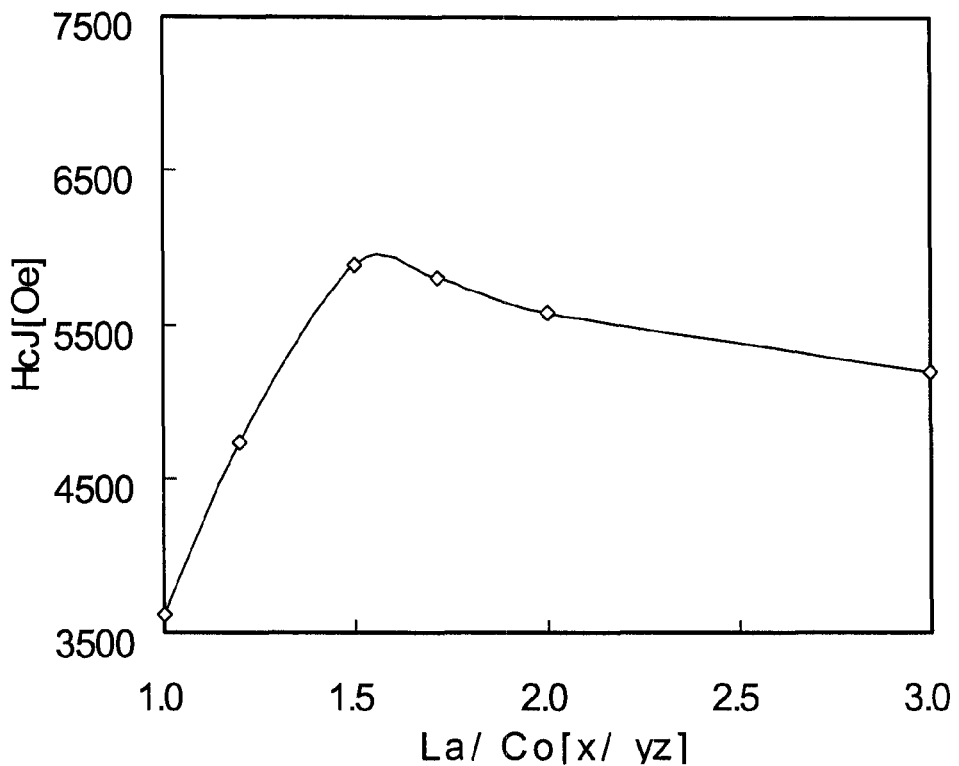
FIG. 7 is a graph showing the relation between La/Co (x/yz) and the coercive force (HcJ) in Example 2.

FIG. 5 shows the relation between the ratio (x/yz) of the La to Co and Br+(⅓)HcJ, FIG. 6 shows the relation between x/yz and the residual magnetic flux density (Br), and further, FIG. 7 shows the relation between x/yz and the coercive force (HcJ). As can be seen from FIG. 5, when x/yz falls within a range from 1.3 to 1.8, Br+(⅓)HcJ can attain the values of 6200 or more. For the purpose of obtaining the higher values of Br+(⅓)HcJ, x/yz is preferably set at 1.35 to 1.75, and more preferably at 1.4 to 1.7.

Also, as can be easily seen from FIGS. 6 and 7, the improvement of Br+(⅓)HcJ is exclusively provided by the improvement of the coercive force (HcJ).

TABLE 4

| Sample No. | La x | Ca m | Sr 1 − x − m | Fe (12 − y)*z | Co yz | z | y | La/Co x/yz | α/(α + Ca) | Br G | HcJ Oe | Hk/ HcJ | Br + 1/ 3HcJ | M phase proportion % | Sintering temp. ° C. | HcJ temp prop. %/° C. |
|---|---|---|---|---|---|---|---|---|---|---|---|---|---|---|---|---|
| 40 | 0.54 | 0.38 | 0.09 | 10.00 | 0.18 | 0.85 | 0.21 | 3.00 | 0.19 | 3986 | 5196 | 91 | 5718 | 83 | 1140 | 0.14 |
| 41 | 0.54 | 0.38 | 0.09 | 9.91 | 0.27 | 0.85 | 0.32 | 2.00 | 0.19 | 4195 | 5573 | 92 | 6053 | 85 | 1140 | 0.10 |
| 42 | 0.54 | 0.38 | 0.09 | 9.87 | 0.31 | 0.85 | 0.37 | 1.71 | 0.19 | 4316 | 5796 | 92 | 6248 | 95 | 1140 | 0.08 |
| 43 | 0.54 | 0.38 | 0.09 | 9.82 | 0.36 | 0.85 | 0.42 | 1.50 | 0.19 | 4448 | 5889 | 92 | 6411 | 100 | 1140 | 0.06 |
| 44 | 0.54 | 0.38 | 0.09 | 9.73 | 0.45 | 0.85 | 0.53 | 1.20 | 0.19 | 4453 | 4738 | 91 | 6032 | 100 | 1140 | 0.03 |
| 45 | 0,54 | 0.38 | 0.09 | 9.64 | 0.54 | 0.85 | 0.63 | 1.00 | 0.19 | 4450 | 3620 | 91 | 5657 | 100 | 1140 | 0.00 |

Figure 8:
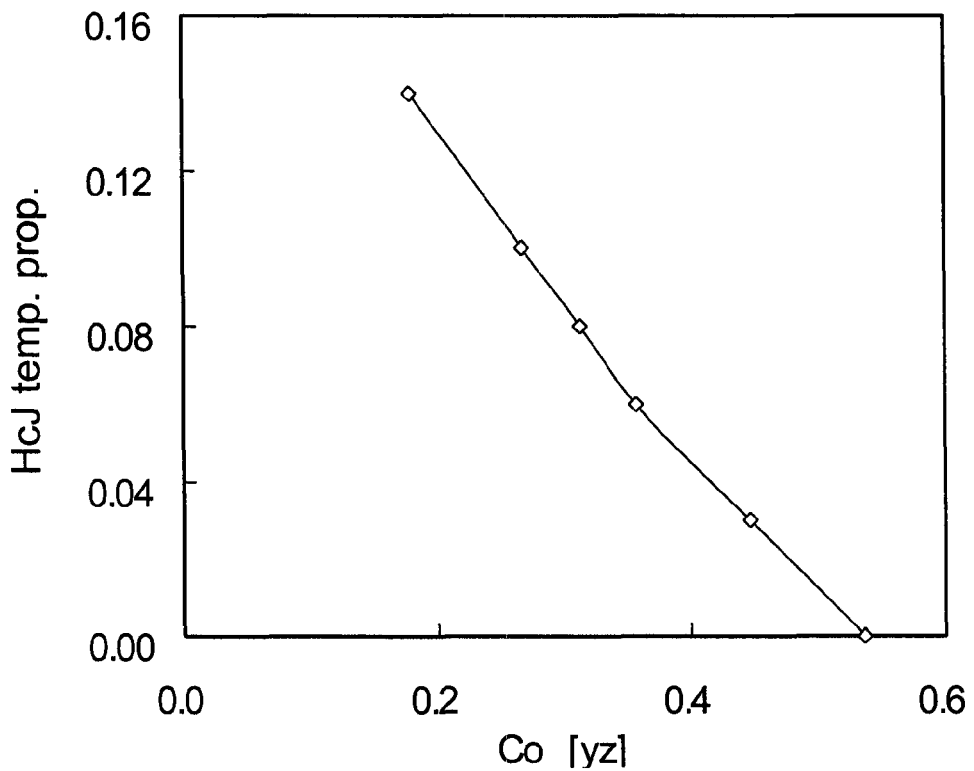
FIG. 8 is a graph showing the relation between the amount of Co (yz) and the coercive force (HcJ) temperature property (HcJ temp. prop.) in Example 2.

FIG. 8 shows the relation between the amount of Co (yz) and the coercive force (HcJ) temperature property (HcJ temp. prop.). The increase of the amount of Co improves the coercive force (HcJ) temperature property. Accordingly, when the ferrite magnetic material of the present invention is used in applications in which the ambient temperature varies abruptly and widely, the Co(yz) is set preferably at 0.3 or more, and more preferably at 0.35 or more.

EXAMPLE 3

As the starting raw materials, lanthanum hydroxide (La(OH)$_3$), calcium carbonate (CaCO$_3$), strontium carbonate (SrCO$_3$), ferric oxide (Fe$_2$O$_3$) and cobalt oxide (CO$_3$O$_4$) were prepared. These starting raw materials constituting the main constituents were weighed out to satisfy the following formula (j) (in molar ratios) with respect to the main constituents after sintering exclusive of oxygen. The weighed main constituents are shown in Table 5. It is to be noted that Table 5 also shows the values of x, y, z and others in the above described composition formula (1).

$$La_{0.6}Ca_{0.3}Sr_{0.1}Fe_{12z-0.4}Co_{0.40} \quad \text{Formula (j)}$$

12z: 10.2 to 13.6

TABLE 5

| Sample No. | La x | Ca m | Sr 1−x−m | Fe (12−y)*z | Co yz | z | y | La/Co x/yz | Fe+Co 12z |
|---|---|---|---|---|---|---|---|---|---|
| 50 | 0.6 | 0.3 | 0.1 | 9.8 | 0.40 | 0.850 | 0.47 | 1.50 | 10.2 |
| 51 | 0.6 | 0.3 | 0.1 | 10.0 | 0.40 | 0.867 | 0.46 | 1.50 | 10.4 |
| 52 | 0.6 | 0.3 | 0.1 | 10.2 | 0.40 | 0.883 | 0.45 | 1.50 | 10.6 |
| 53 | 0.6 | 0.3 | 0.1 | 10.4 | 0.40 | 0.900 | 0.44 | 1.50 | 10.8 |
| 54 | 0.6 | 0.3 | 0.1 | 10.6 | 0.40 | 0.917 | 0.44 | 1.50 | 11.0 |
| 55 | 0.6 | 0.3 | 0.1 | 10.8 | 0.40 | 0.933 | 0.43 | 1.50 | 11.2 |
| 56 | 0.6 | 0.3 | 0.1 | 11.0 | 0.40 | 0.950 | 0.42 | 1.50 | 11.4 |
| 57 | 0.6 | 0.3 | 0.1 | 11.2 | 0.40 | 0.967 | 0.41 | 1.50 | 11.6 |
| 58 | 0.6 | 0.3 | 0.1 | 11.4 | 0.40 | 0.983 | 0.41 | 1.50 | 11.8 |
| 59 | 0.6 | 0.3 | 0.1 | 11.6 | 0.40 | 1.000 | 0.40 | 1.50 | 12.0 |
| 60 | 0.6 | 0.3 | 0.1 | 11.8 | 0.40 | 1.017 | 0.39 | 1.50 | 12.2 |
| 61 | 0.6 | 0.3 | 0.1 | 12.0 | 0.40 | 1.033 | 0.39 | 1.50 | 12.4 |
| 62 | 0.6 | 0.3 | 0.1 | 12.4 | 0.40 | 1.067 | 0.38 | 1.50 | 12.8 |
| 63 | 0.6 | 0.3 | 0.1 | 12.8 | 0.40 | 1.100 | 0.36 | 1.50 | 13.2 |
| 64 | 0.6 | 0.3 | 0.1 | 13.2 | 0.40 | 1.133 | 0.35 | 1.50 | 13.6 |

The above described raw materials were mixed and pulverized with a wet attritor for 2 hours to yield slurry-like raw material compositions. These slurries were dried, and thereafter calcined in air at 1350° C. for 3 hours.

The calcined bodies thus obtained were pulverized with a rod vibration mill.

The subsequent milling was carried out with a ball mill in two steps. The first milling step was such that a pulverized powder was treated for 88 hours with water added thereto. After the first milling step, the milled powders were heat treated in the atmosphere of air at 800° C.

Subsequently, the heat treated powders were added with water and sorbitol, and further with SiO$_2$ in 0.60% by weight and CaCO$_3$ in 1.40% by weight, both as additives; and the thus treated powders were subjected to the second milling in which the powders were treated with a wet ball mill for 25 hours.

The solid content concentrations of the obtained milled slurries were regulated, and by using a wet magnetic-field compacting machine, columnar compacted bodies of 30 mm in diameter and 15 mm in thickness were obtained in an applied magnetic field of 12 kOe. The compacted bodies were sufficiently dried in air at room temperature, and subsequently, subjected to a sintering in which the compacted bodies were retained in air at 1140° C. for one hour.

The composition (Sr, La, Ca, Fe and Co) of each of the obtained sintered bodies was measured by means of fluorescent X-ray quantitative analysis. Additionally, the upper and lower surfaces of each of the columnar sintered bodies thus obtained were processed, and then the residual magnetic flux density (Br) and the coercive force (HcJ) were measured by use of a B-H tracer with a maximum applied magnetic field of 25 kOe. The phases of each of the obtained sintered bodies was analyzed by means of X-ray diffraction under the above described conditions to identify the proportion of the M-type ferrite phase. The results thus obtained are shown in Table 6.

Figure 9:
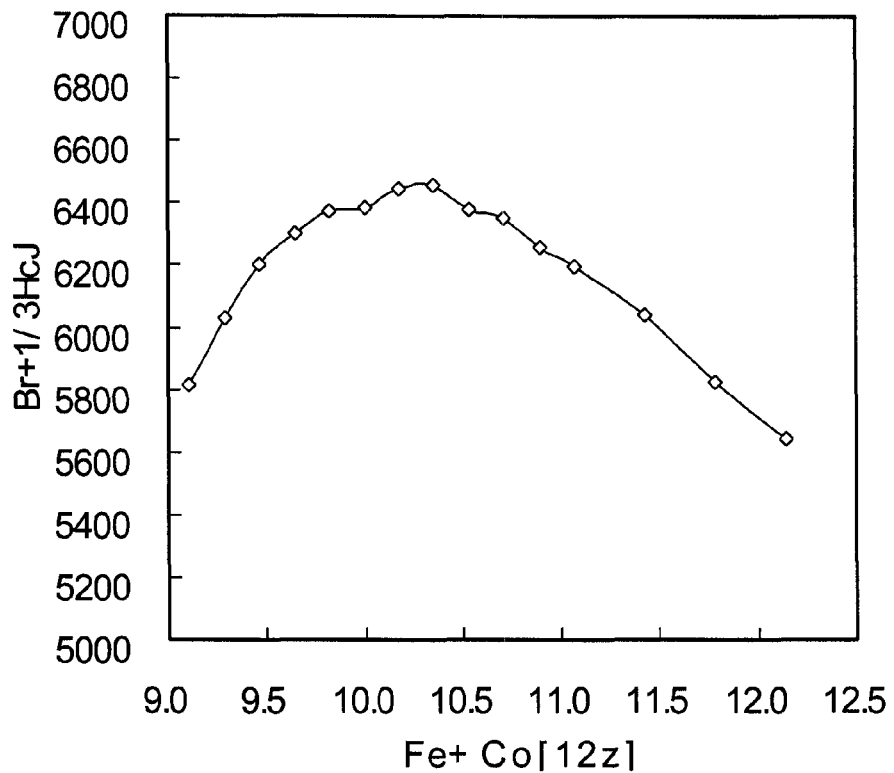
FIG. 9 is a graph showing the relation between the total amount (12z) of Fe and Co and Br+(⅓)HcJ in Example 3.
Figure 10:
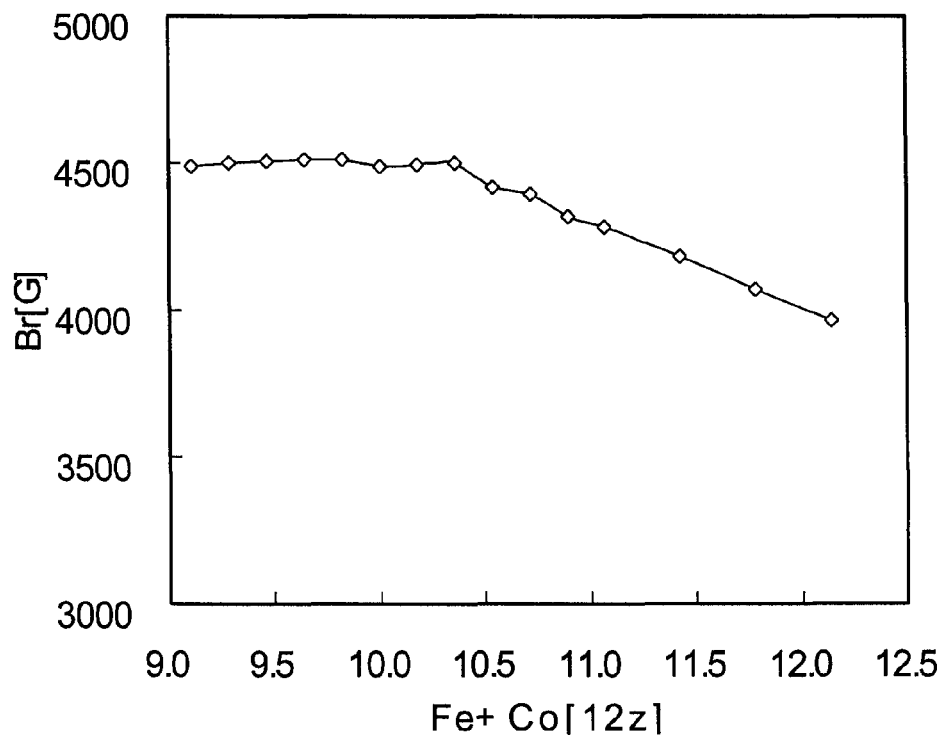
FIG. 10 is a graph showing the relation between the total amount (12z) of Fe and Co and the residual magnetic flux density (Br) in Example 3.
Figure 11:
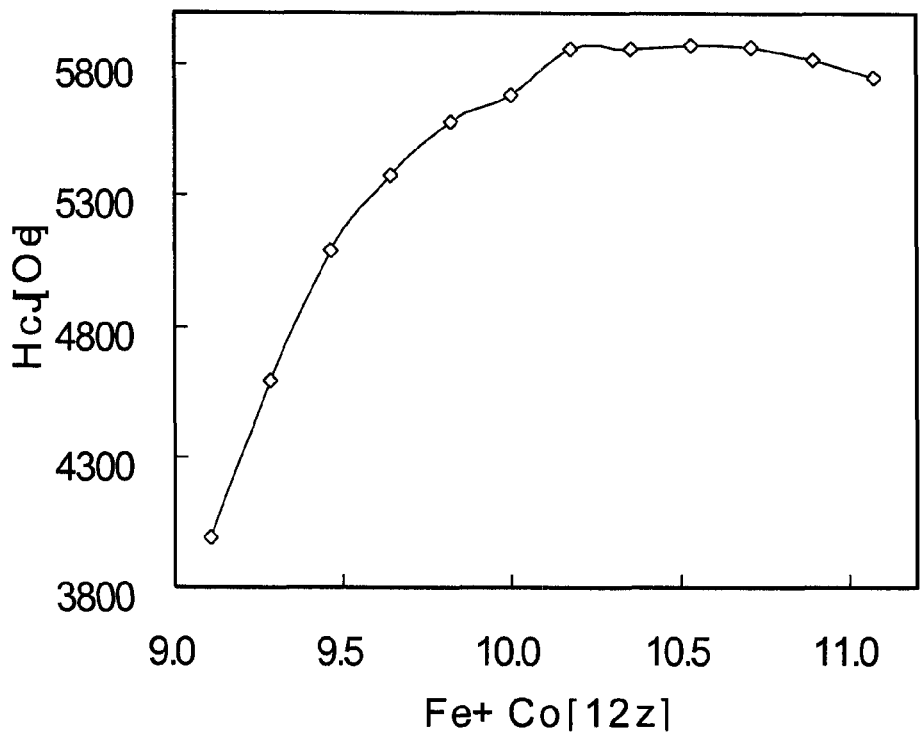
FIG. 11 is a graph showing the relation between the total amount (12z) of Fe and Co and the coercive force (HcJ) in Example 3.

FIG. 9 shows the relation between the total amount (12z) of Fe and Co and Br+(⅓)HcJ, FIG. 10 shows the relation between 12z and the residual magnetic flux density (Br), and further, FIG. 11 shows the relation between 12z and the coercive force (HcJ). As can be seen from FIG. 9, when 12z falls within a range from 9.5 to 11, Br+(⅓)HcJ can attain the values of 6200 or more. For the purpose of obtaining the higher values of Br+(⅓)HcJ, 12z is preferably set at 9.7 to 10.7, and more preferably at 10 to 10.5.

Also, as can be easily seen from FIGS. 10 and 11, the improvement of Br+(⅓)HcJ is exclusively provided by the improvement of the coercive force (HcJ).

TABLE 6

| Sample No. | La x | Ca m | Sr 1−x−m | Fe (12−y)*z | Co yz | z | y | La/Co x/yz | Fe+Co 12z | α/(α+Ca) | Br G | HcJ Oe | Hk/HcJ | Br+1/3HcJ | M phase proportion % | Sintering temp. ° C. |
|---|---|---|---|---|---|---|---|---|---|---|---|---|---|---|---|---|
| 50 | 0.54 | 0.38 | 0.09 | 8.75 | 0.36 | 0.759 | 0.47 | 1.50 | 9.11 | 0.19 | 4487 | 3989 | 91 | 5817 | 100 | 1140 |
| 51 | 0.54 | 0.38 | 0.09 | 8.93 | 0.36 | 0.774 | 0.46 | 1.50 | 9.29 | 0.19 | 4501 | 4595 | 92 | 6033 | 100 | 1140 |
| 52 | 0.54 | 0.38 | 0.09 | 9.11 | 0.36 | 0.789 | 0.45 | 1.50 | 9.46 | 0.19 | 4505 | 5091 | 92 | 6202 | 100 | 1140 |
| 53 | 0.54 | 0.38 | 0.09 | 9.29 | 0.36 | 0.804 | 0.44 | 1.50 | 9.64 | 0.19 | 4509 | 5379 | 92 | 6302 | 100 | 1140 |
| 54 | 0.54 | 0.38 | 0.09 | 9.46 | 0.36 | 0.818 | 0.44 | 1.50 | 9.82 | 0.19 | 4510 | 5585 | 93 | 6372 | 100 | 1140 |
| 55 | 0.54 | 0.38 | 0.09 | 9.64 | 0.36 | 0.833 | 0.43 | 1.50 | 10.00 | 0.19 | 4489 | 5683 | 93 | 6383 | 100 | 1140 |
| 56 | 0.54 | 0.38 | 0.09 | 9.82 | 0.36 | 0.848 | 0.42 | 1.50 | 10.18 | 0.19 | 4492 | 5866 | 92 | 6447 | 100 | 1140 |
| 57 | 0.54 | 0.38 | 0.09 | 10.00 | 0.36 | 0.863 | 0.41 | 1.50 | 10.36 | 0.19 | 4502 | 5860 | 92 | 6455 | 100 | 1140 |
| 58 | 0.54 | 0.38 | 0.09 | 10.18 | 0.36 | 0.878 | 0.41 | 1.50 | 10.54 | 0.19 | 4419 | 5874 | 92 | 6377 | 98 | 1140 |
| 59 | 0.54 | 0.38 | 0.09 | 10.36 | 0.36 | 0.893 | 0.40 | 1.50 | 10.71 | 0.19 | 4392 | 5873 | 93 | 6350 | 97 | 1140 |
| 60 | 0.54 | 0.38 | 0.09 | 10.54 | 0.36 | 0.908 | 0.39 | 1.50 | 10.89 | 0.19 | 4319 | 5824 | 91 | 6260 | 95 | 1140 |
| 61 | 0.54 | 0.38 | 0.09 | 10.71 | 0.36 | 0.923 | 0.39 | 1.50 | 11.07 | 0.19 | 4280 | 5754 | 91 | 6198 | 94 | 1140 |
| 62 | 0.54 | 0.38 | 0.09 | 11.07 | 0.36 | 0.952 | 0.38 | 1.50 | 11.43 | 0.19 | 4185 | 5568 | 92 | 6041 | 93 | 1140 |
| 63 | 0.54 | 0.38 | 0.09 | 11.43 | 0.36 | 0.982 | 0.36 | 1.50 | 11.79 | 0.19 | 4071 | 5261 | 93 | 5825 | 92 | 1140 |
| 64 | 0.54 | 0.38 | 0.09 | 11.79 | 0.36 | 1.012 | 0.35 | 1.50 | 12.14 | 0.19 | 3966 | 5027 | 93 | 5642 | 91 | 1140 |

FIG. 10 shows the relation between the amount of Fe +Co (12z) and the residual magnetic flux density (Br), and FIG. 11 shows the relation between the amount of Fe+Co(12z) and the coercive force (HcJ). On the basis of FIGS. 10 and 11, for the purpose of attaining a high residual magnetic flux density (Br) and a high coercive force (HcJ), the Fe+Co (12z) value is set preferably at 9.5 to 10.5 and more preferably at 9.7 to 10.4.

EXAMPLE 4

As the starting raw materials, lanthanum hydroxide (La (OH)$_3$), calcium carbonate (CaCO$_3$), barium carbonate (BaCO$_3$), ferric oxide (Fe$_2$O$_3$) and cobalt oxide (CO$_3$O$_4$) were prepared. These starting raw materials constituting the main constituents were weighed out to satisfy the following formula (k) (in molar ratios) with respect to the main constituents after sintering exclusive of oxygen. The weighed main constituents are shown in Table 7. It is to be noted that Table 7 also shows the values of x, y, z and others in the above described composition formula (1).

$$La_{0.6}Ca_{0.3}Ba_{0.1}Fe_{12z-0.4}Co_{0.40} \quad \text{Formula (k)}$$

12z: 11.4 to 11.8

TABLE 7

| Sample No. | La x | Ca m | Ba 1 − x − m | Fe (12 − y)*z | Co yz | z | y | La/Co x/yz |
|---|---|---|---|---|---|---|---|---|
| 70 | 0.6 | 0.3 | 0.1 | 11.0 | 0.40 | 0.95 | 0.42 | 1.50 |
| 71 | 0.6 | 0.3 | 0.1 | 11.2 | 0.40 | 0.97 | 0.41 | 1.50 |
| 72 | 0.6 | 0.3 | 0.1 | 11.4 | 0.40 | 0.98 | 0.41 | 1.50 |

The above described raw materials were mixed and pulverized with a wet attritor for 2 hours to yield slurry-like raw material compositions. These slurries were dried, and thereafter calcined in air at 1300° C. for 3 hours.

The calcined bodies thus obtained were pulverized with a rod vibration mill.

The subsequent milling was carried out with a ball mill in two steps. The first milling step was such that a pulverized powder was treated for 88 hours with water added thereto. After the first milling step, the milled powders were heat treated in the atmosphere of air at 800° C.

Subsequently, the heat treated powders were added with water and sorbitol, and further with SiO$_2$ in 0.60% by weight and CaCO$_3$ in 1.40% by weight, both as additives; and the thus treated powders were subjected to the second milling in which the powders were treated with a wet ball mill for 25 hours.

The solid content concentrations of the obtained milled slurries were regulated, and by using a wet magnetic-field compacting machine, columnar compacted bodies of 30 mm in diameter and 15 mm in thickness were obtained in an applied magnetic field of 12 kOe. The compacted bodies were sufficiently dried in air at room temperature, and subsequently, subjected to a sintering in which the compacted bodies were retained in air at 1140° C. for one hour.

The composition (La, Ca, Ba, Fe and Co) of each of the obtained sintered bodies was measured by means of fluorescent X-ray quantitative analysis. Additionally, the upper and lower surfaces of each of the columnar sintered bodies thus obtained were processed, and then the residual magnetic flux density (Br) and the coercive force (HcJ) were measured by use of a B—H tracer with a maximum applied magnetic field of 25 kOe. The phases of each of the obtained sintered bodies were analyzed by means of X-ray diffraction under the above described conditions to identify the proportion of the M-type ferrite phase. The results thus obtained are shown in Table 8. As shown in Table 8, even when the element α is Ba, there can be obtained magnetic properties in which the Br+(⅓)HcJ value is 6200 or more.

TABLE 8

| Sample No. | La x | Ca m | Ba 1 − x − m | Fe (12 − y)*z | Co yz | z | y | La/Co x/yz | α/ (α + Ca) | HcJ Oe | Br G | Hk/ HcJ | Br + 1/ 3HcJ | M phase proportion % |
|---|---|---|---|---|---|---|---|---|---|---|---|---|---|---|
| 70 | 0.54 | 0.38 | 0.09 | 9.82 | 0.36 | 0.848 | 0.42 | 1.50 | 0.19 | 4979 | 4546 | 91 | 6206 | 100 |
| 71 | 0.54 | 0.38 | 0.09 | 10.00 | 0.36 | 0.863 | 0.41 | 1.50 | 0.19 | 5208 | 4479 | 91 | 6215 | 100 |
| 72 | 0.54 | 0.38 | 0.09 | 10.18 | 0.36 | 0.878 | 0.41 | 1.50 | 0.19 | 5198 | 4479 | 91 | 6212 | 100 |

EXAMPLE 5

As the starting raw materials, lanthanum hydroxide (La (OH)$_3$), calcium carbonate (CaCO$_3$), strontium carbonate (SrCO$_3$), ferric oxide (Fe$_2$O$_3$) and cobalt oxide (CO$_3$O$_4$) were prepared. These starting raw materials constituting the main constituents were weighed out to satisfy the following formulas (l) and (m) (in molar ratios) with respect to the main constituents after sintering exclusive of oxygen.

$$La_{0.6}Ca_{0.3}Sr_{0.1}Fe_{11.2}Co_{0.4} \quad \text{Formula (l)}$$

$$La_{0.6}Ca_{0.4}Fe_{11.2}Co_{0.4} \quad \text{Formula (m)}$$

The above described raw materials were mixed and pulverized with a wet attritor for 2 hours to yield slurry-like raw material compositions. These slurries were dried, and thereafter calcined in air at 1350° C. for 3 hours.

The calcined bodies thus obtained were pulverized with a rod vibration mill.

The subsequent milling was carried out with a ball mill in two steps. The first milling step was such that a pulverized powder was treated for 88 hours with water added thereto. After the first milling step, the milled powders were heat treated in the atmosphere of air at 800° C.

Subsequently, the heat treated powders were added with water and sorbitol, and further with SiO$_2$ in the amounts shown below and CaCO$_3$ in 1.40% by weight, both as additives; and the thus treated powders were subjected to the second milling in which the powders were treated with a wet ball mill for 25 hours.

SiO$_2$: 0, 0.15, 0.30, 0.45, 0.60, 0.75

The solid content concentrations of the obtained milled slurries were regulated, and by using a wet magnetic-field compacting machine, columnar compacted bodies of 30 mm in diameter and 15 mm in thickness were obtained in an applied magnetic field of 12 kOe. The compacted bodies were sufficiently dried in air at room temperature, and subsequently, subjected to a sintering in which the compacted bodies were retained in air at 1140° C. for one hour.

Figure 12:
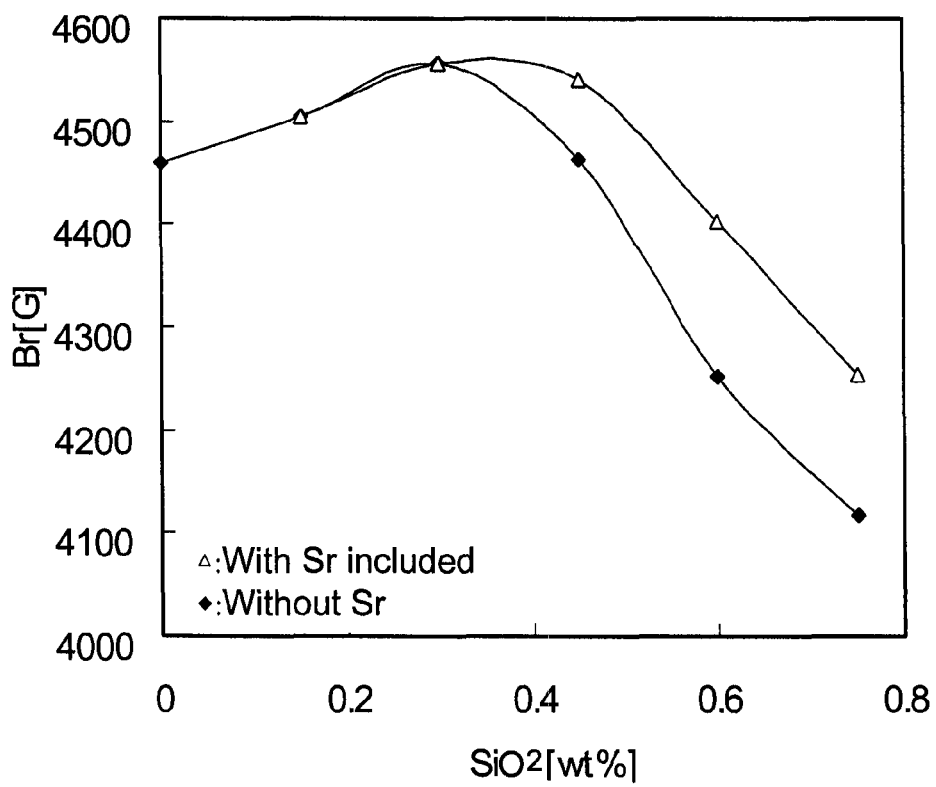
FIG. 12 is a graph showing the relation between the amount of SiO$_2$ and the residual magnetic flux density (Br) in Example 5.
Figure 13:
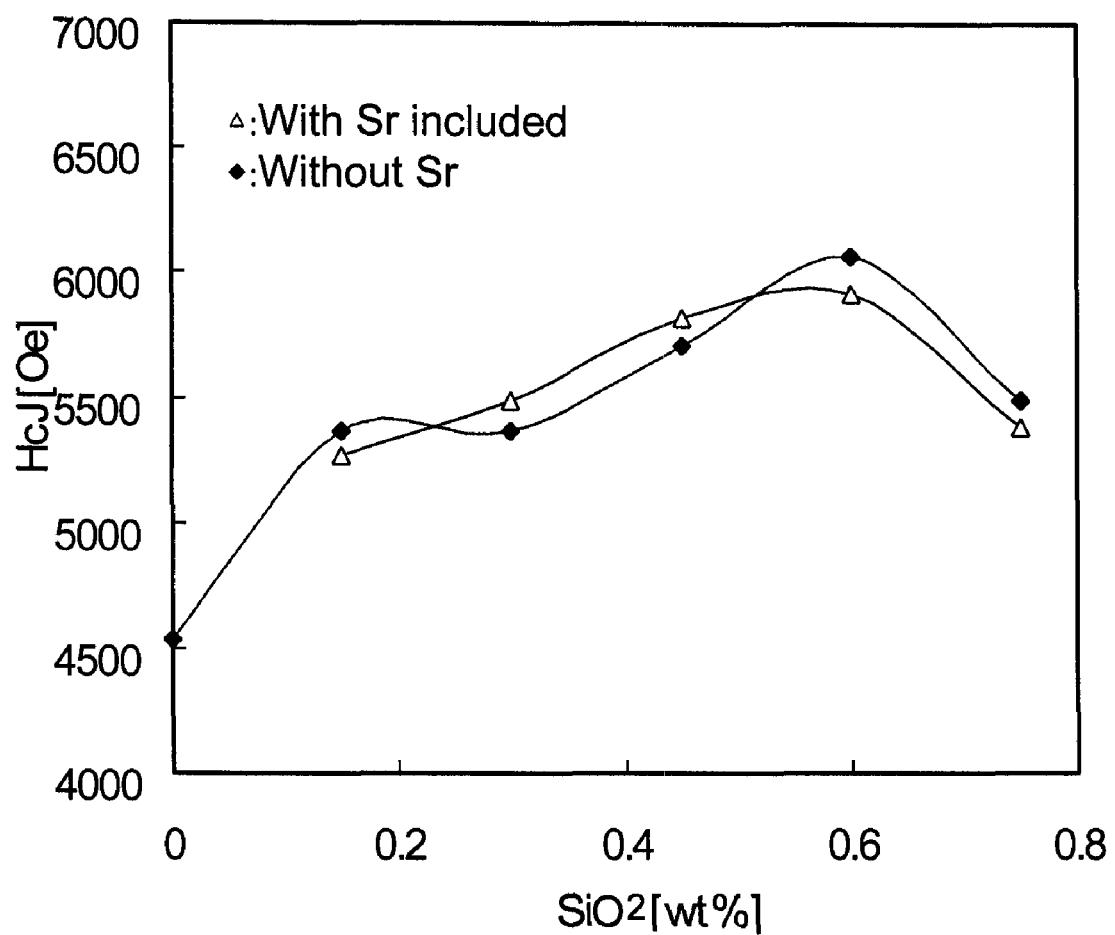
FIG. 13 is a graph showing the relation between the amount of SiO$_2$ and the coercive force (HcJ) in Example 5.

The upper and lower surfaces of each of the columnar sintered bodies thus obtained were processed, and then the residual magnetic flux density (Br) and the coercive force (HcJ) were measured by use of a B—H tracer with a maximum applied magnetic field of 25 kOe. FIG. 12 shows the relation between the amount of $SiO_2$ and the residual magnetic flux density (Br), and FIG. 13 shows the relation between the amount of $SiO_2$ and the coercive force (HcJ).

As can be seen from FIG. 12, the inclusion of Sr (the composition formula (1)) expands the $SiO_2$ amount range in which high residual magnetic flux density (Br) is obtained. This fact reduces the variation of the properties as a function of the amount of $SiO_2$ to be advantageous for the purpose of industrial production. Also, as can be seen from FIG. 13, the behavior of the coercive force (HcJ) is indifferent to whether Sr is included or not.

What is claimed is:

1. A ferrite magnetic material comprising as a main phase thereof a ferrite phase having a hexagonal structure, the main phase being represented by the following composition formula (1): $La_xCa_m\alpha_{1-x-m}(Fe_{12-y}Co_y)_z$ with $\alpha$ representing one or two of Ba and Sr; wherein the constituent ratios of the metal elements constituting the main phase satisfy the following conditions:

x and m are the values in a region bounded by the points, A:(0.53, 0.27), B:(0.64, 0.27), C:(0.64, 0.35), D:(0.53, 0.45), E:(0.47, 0.45) and F:(0.47, 0.32) in the (x, m) coordinates shown in FIG. 2;

$1.4 \leq x/yz \leq 1.71$;

$9.5 \leq 12z \leq 11.0$;

$0.0005 \leq (1-x-m)/(1-x) \leq 0.42$; wherein the ferrite magnetic material is a ferrite sintered magnet with magnetic properties that $Br+(\frac{1}{3})HcJ$ is 6200 or more.

2. The ferrite magnetic material according to claim 1, wherein $1.4 \leq x/yz \leq 1.7$.

3. The ferrite magnetic material according to claim 1, wherein $9.7 \leq 12z \leq 10.7$.

4. The ferrite magnetic material according to claim 1, wherein $10 \leq 12z \leq 10.5$.

5. The ferrite magnetic material according to claim 1, wherein $\alpha$ is Sr.

6. The ferrite magnetic material according to claim 1, wherein $\alpha$ is Ba.

7. The ferrite magnetic material according to claim 1, wherein $\alpha$ is Sr and Ba.

8. A ferrite magnetic material comprising as a main phase thereof a ferrite phase having a hexagonal structure, the main phase being represented by the following composition formula (1): $La_xCa_m\alpha_{1-x-m}(Fe_{12-y}Co_y)_z$ with $\alpha$ representing one or two of Ba and Sr; wherein the constituent ratios of the metal elements constituting the main phase satisfy the following conditions:

x and m are the values in a region bounded by the points, A: (0.53, 0.27), B:(0.64, 0.27), C: (0.64, 0.35), D:(0.53, 0.45), E:(0.47, 0.45) and F:(0.47, 0.32) in the (x, m) coordinates shown in FIG. 2;

$1.4 \leq x/yz \leq 1.71$;

$9.5 \leq 12z \leq 11.0$;

$0.0005 \leq (1-x-m)/(1-x) \leq 0.42$;

wherein the ferrite magnetic material is a ferrite sintered magnet sintered at a temperature of less than 1150° C. and possesses magnetic properties such that $Br+(\frac{1}{3})HcJ$ is 6200 or more.

9. The ferrite magnetic material according to claim 1, wherein $9.7 \leq 12z \leq 10.7$.

10. The ferrite magnetic material according to claim 1, wherein $10 \leq 12z \leq 10.5$.

11. The ferrite magnetic material according to claim 1, wherein $\alpha$ is Sr.

12. The ferrite magnetic material according to claim 1, wherein $\alpha$ is Ba.

13. The ferrite magnetic material according to claim 1, wherein $\alpha$ is Sr and Ba.

14. A ferrite magnetic material comprising as a main phase thereof a ferrite phase having a hexagonal structure, the main phase being represented by the following composition formula (1): $La_xCa_m\alpha_{1-x-m}(Fe_{12-y}Co_y)_z$ with $\alpha$ including Sr; wherein the constituent ratios of the metal elements constituting the main phase satisfy the following conditions:

x and m are the values in a region bounded by the points, A:(0.53, 0.27), B:(0.64, 0.27), C:(0.64, 0.35), D:(0.53, 0.45), E:(0.47, 0.45) and F:(0.47, 0.32) in the (x, m) coordinates shown in FIG. 2;

$1.4 \leq x/yz \leq 1.71$;

$9.5 \leq 12z \leq 11.0$;

$0.0005 \leq (1-x-m)/(1-x) \leq 0.42$;

wherein the ferrite magnetic material is a ferrite sintered magnet sintered at a temperature of less than 1150° C. and possesses magnetic properties such that $Br+(\frac{1}{3})HcJ$ is 6200 or more.

15. The ferrite magnetic material of claim 14, wherein $\alpha$ further includes Ba.

* * * * *